United States Patent Office 3,397,624
Patented Aug. 20, 1968

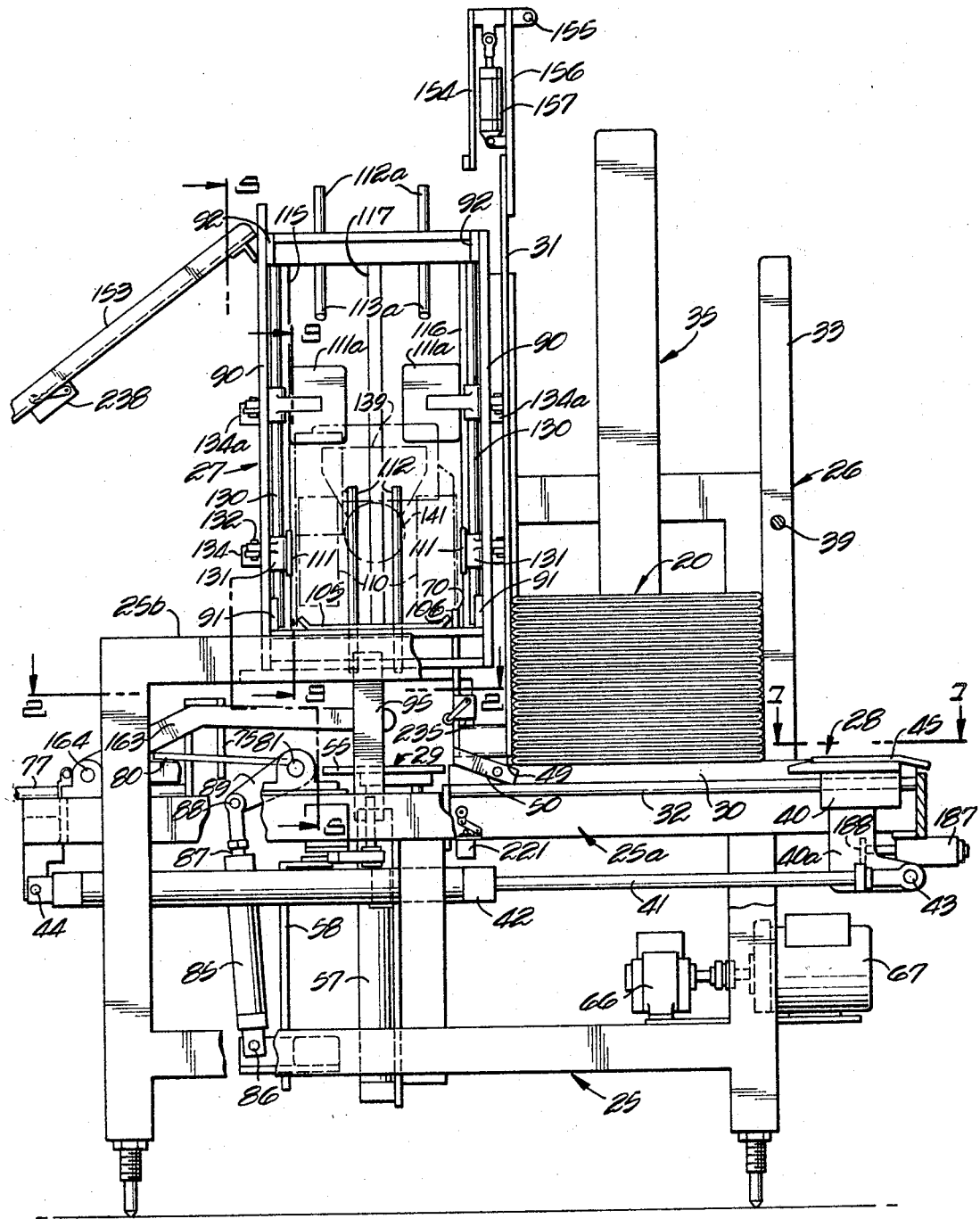

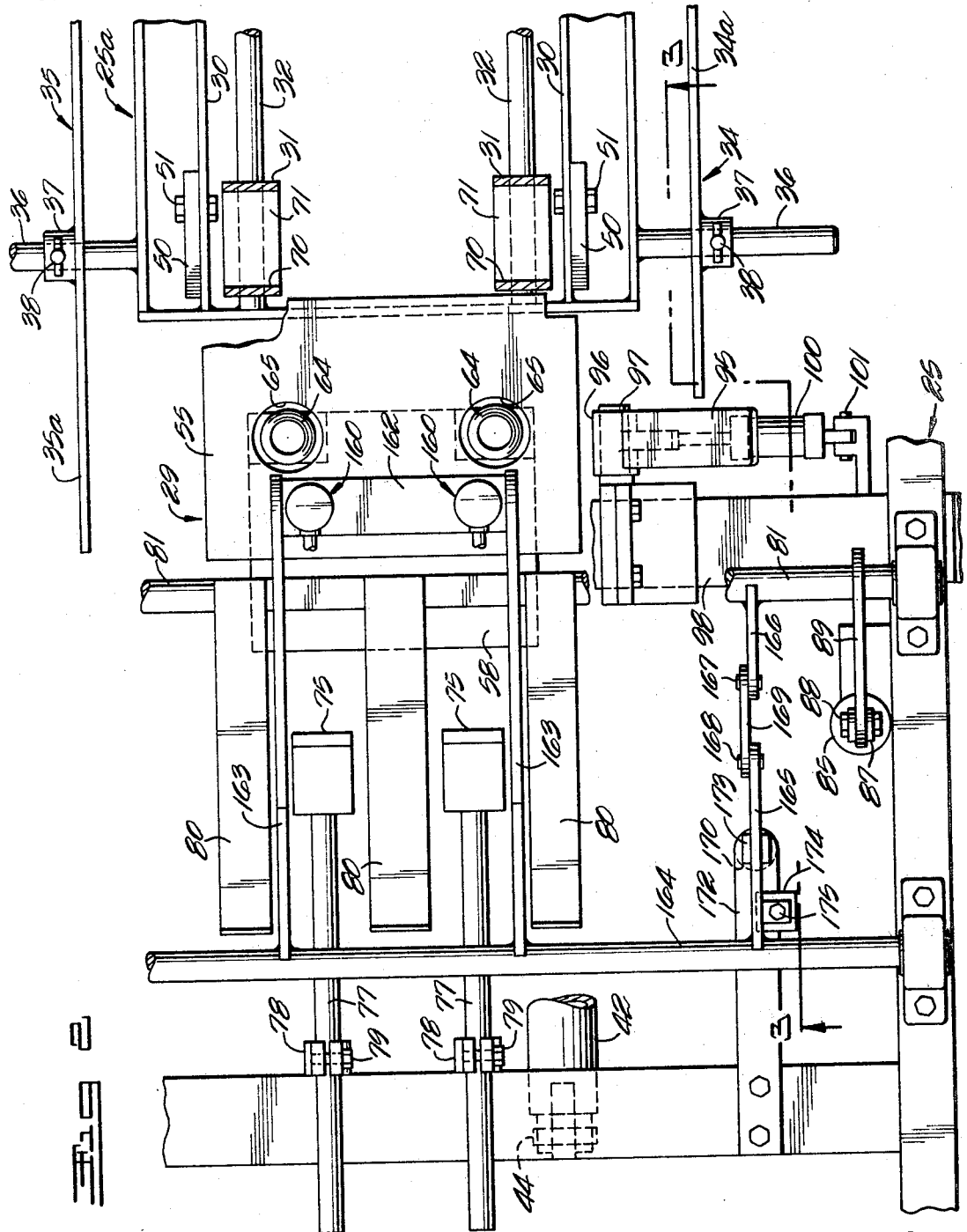

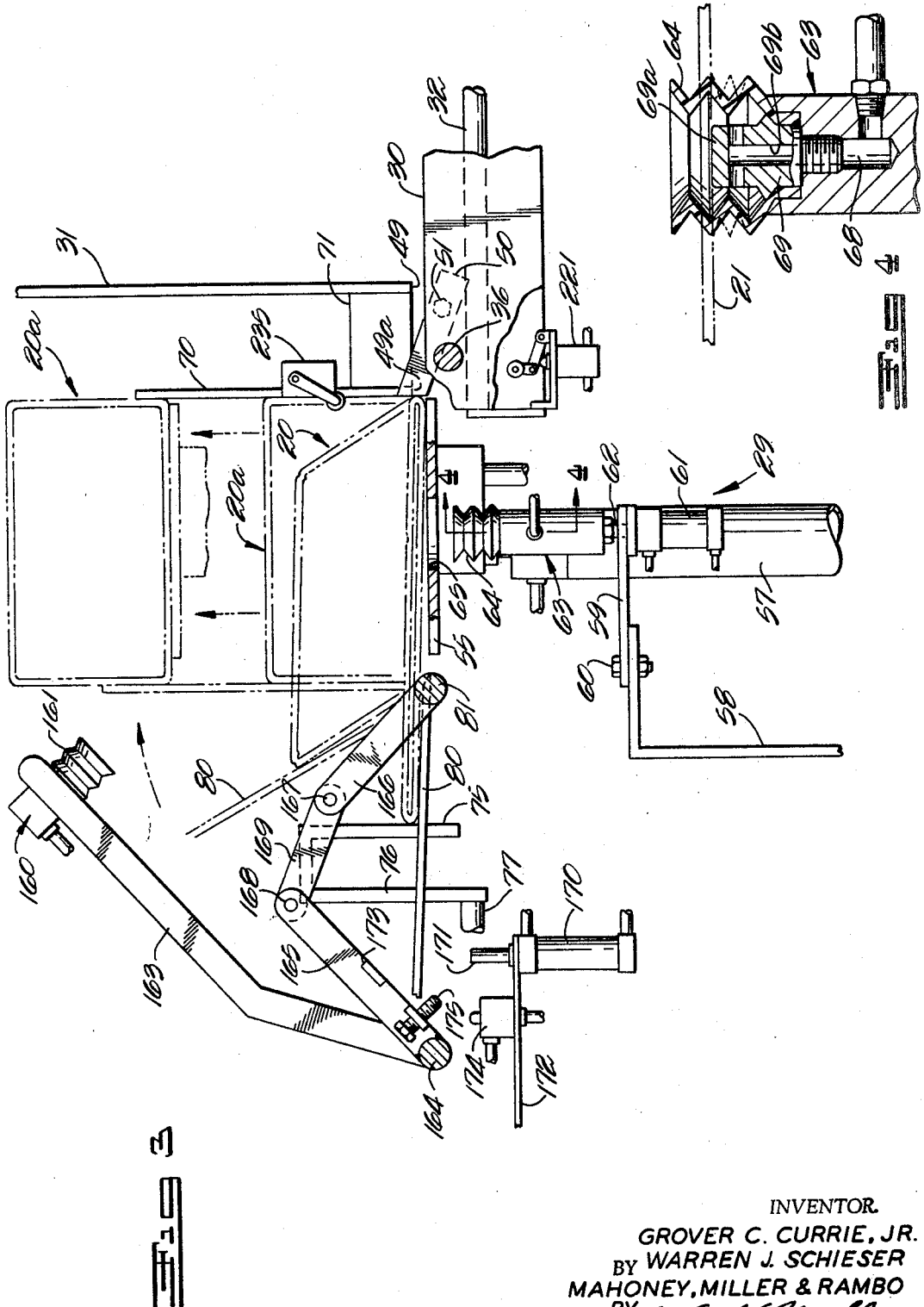

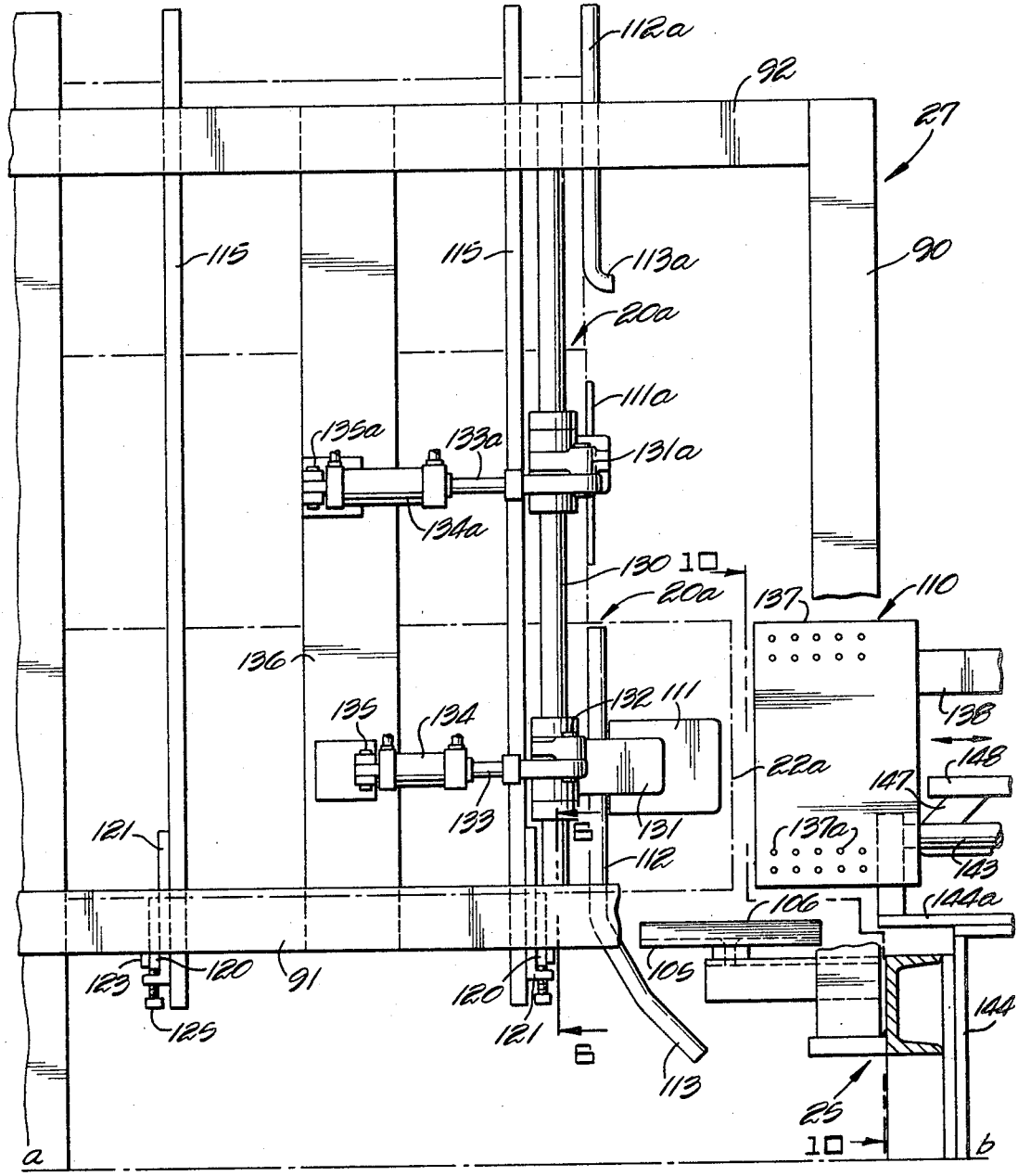

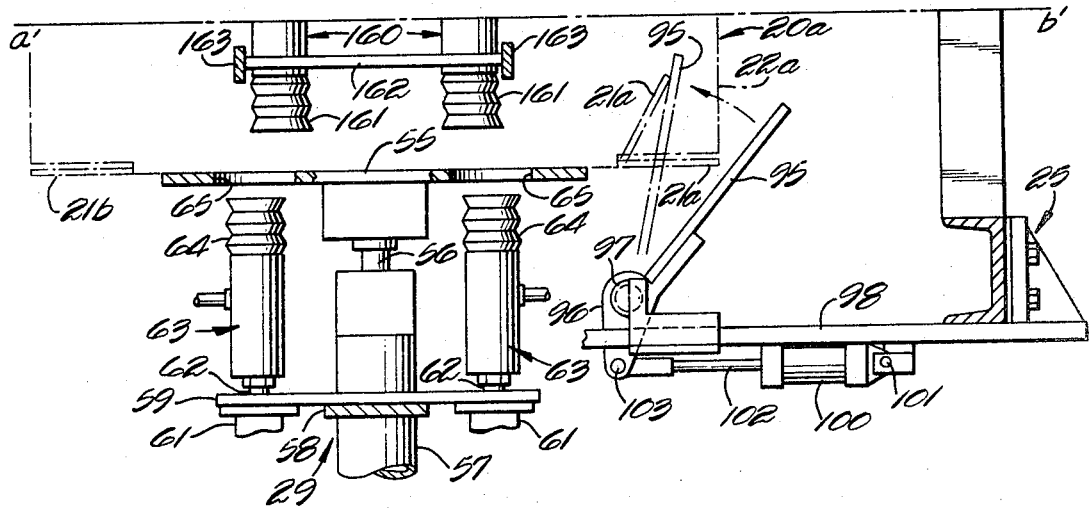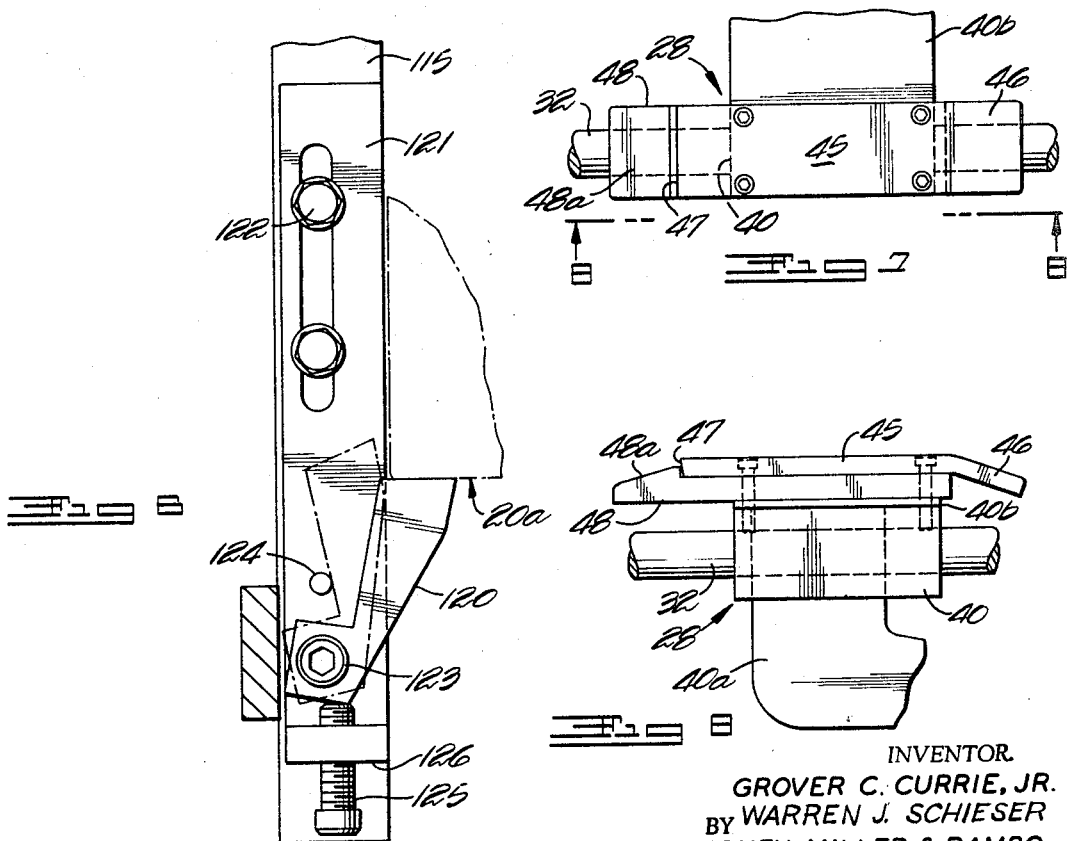

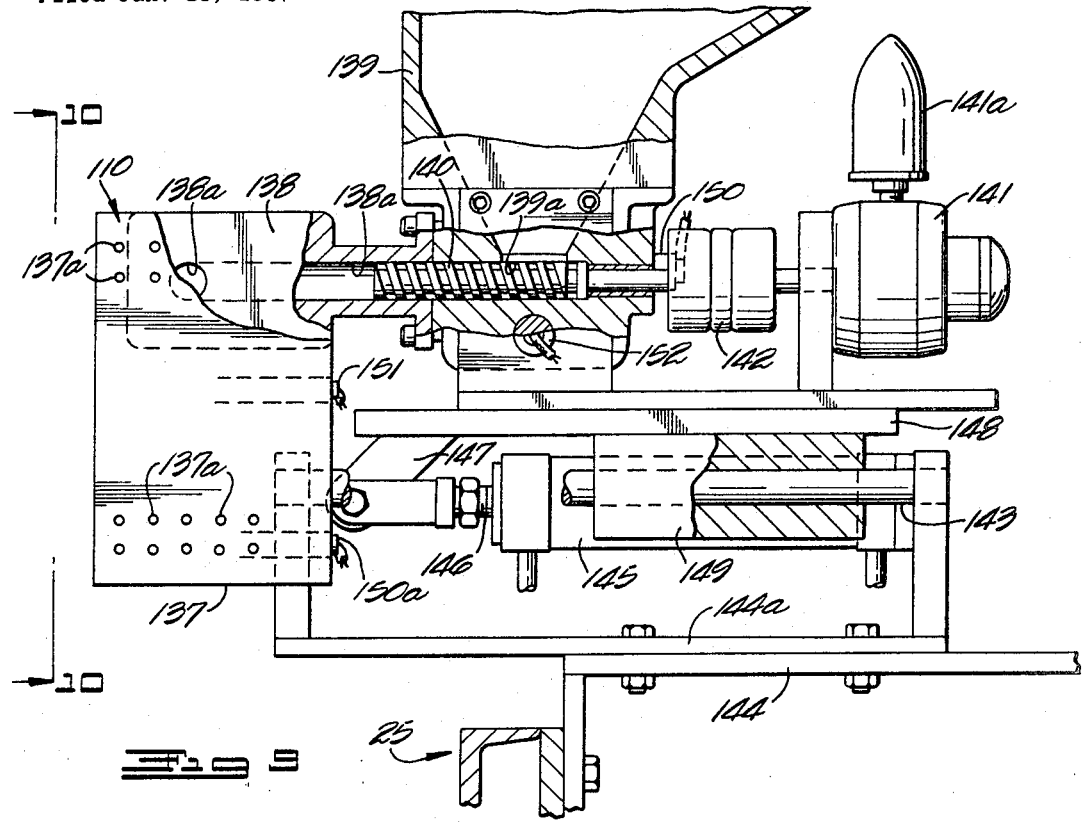
Fig. 9
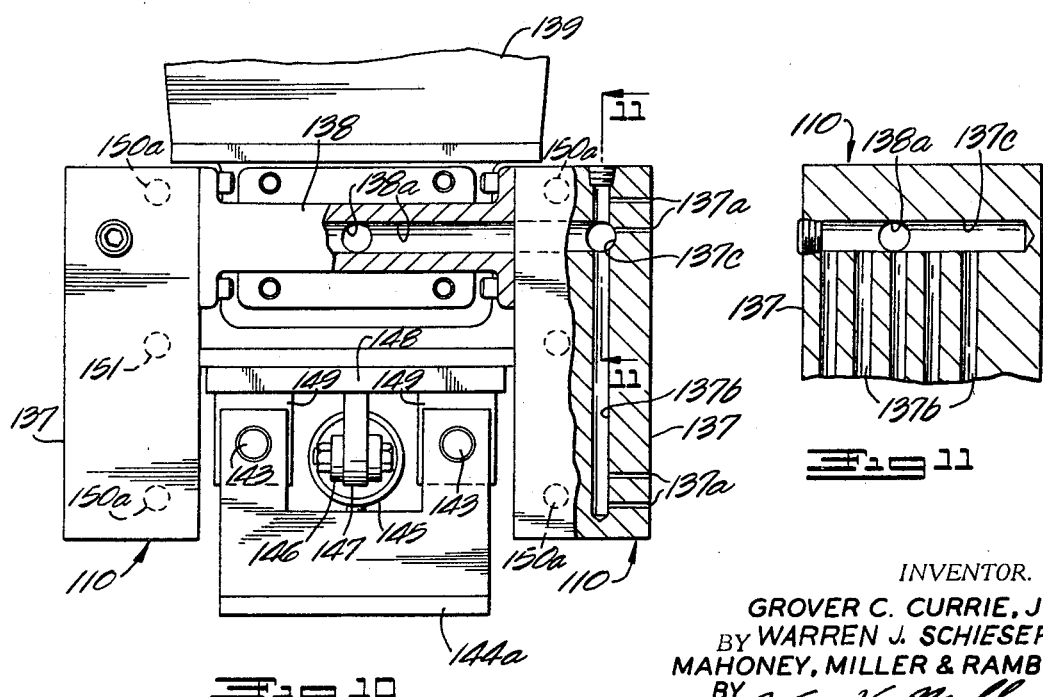
Fig. 10
Fig. 11
INVENTOR.
GROVER C. CURRIE, JR.
BY WARREN J. SCHIESER
MAHONEY, MILLER & RAMBO
BY
ATTORNEYS

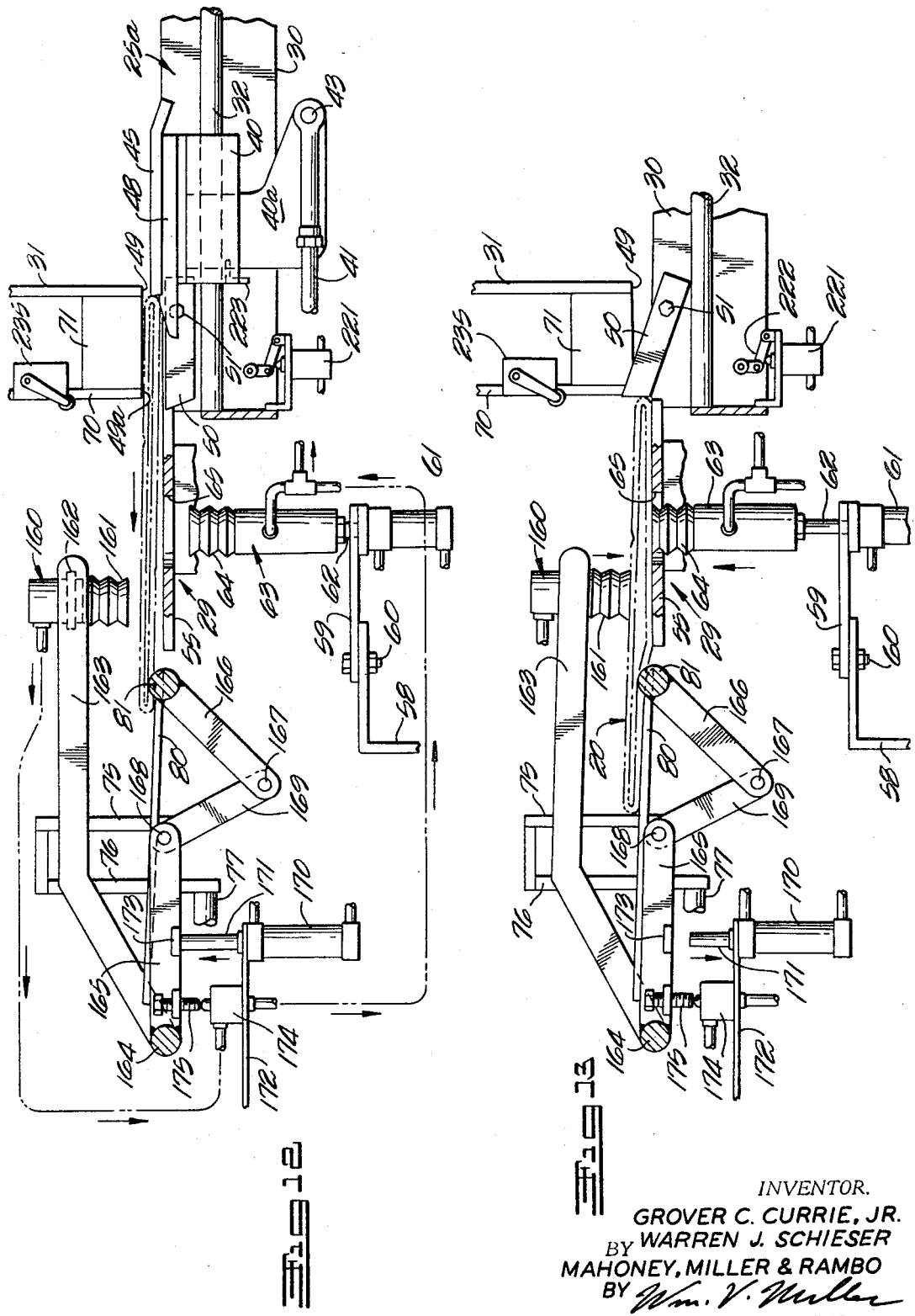

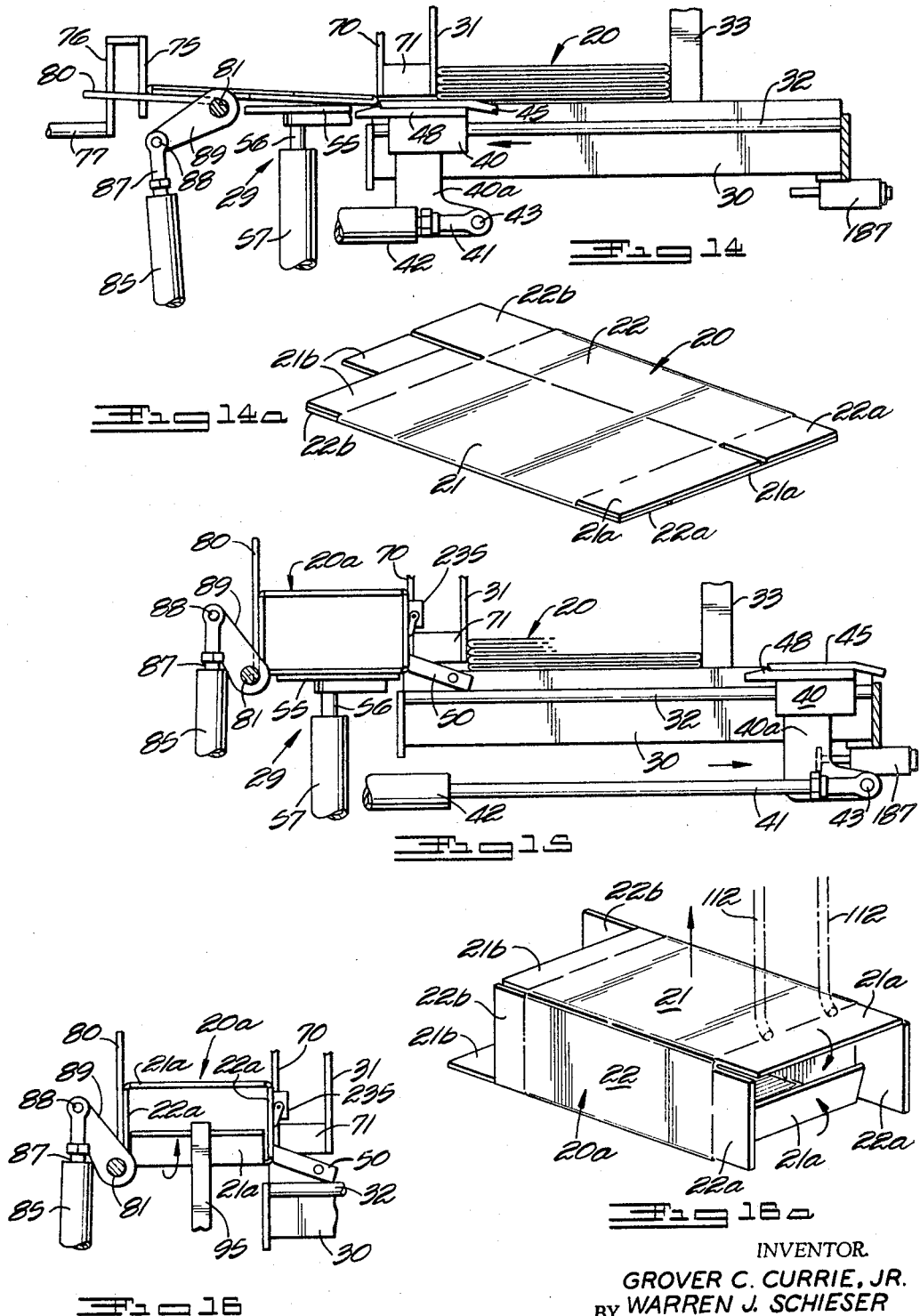

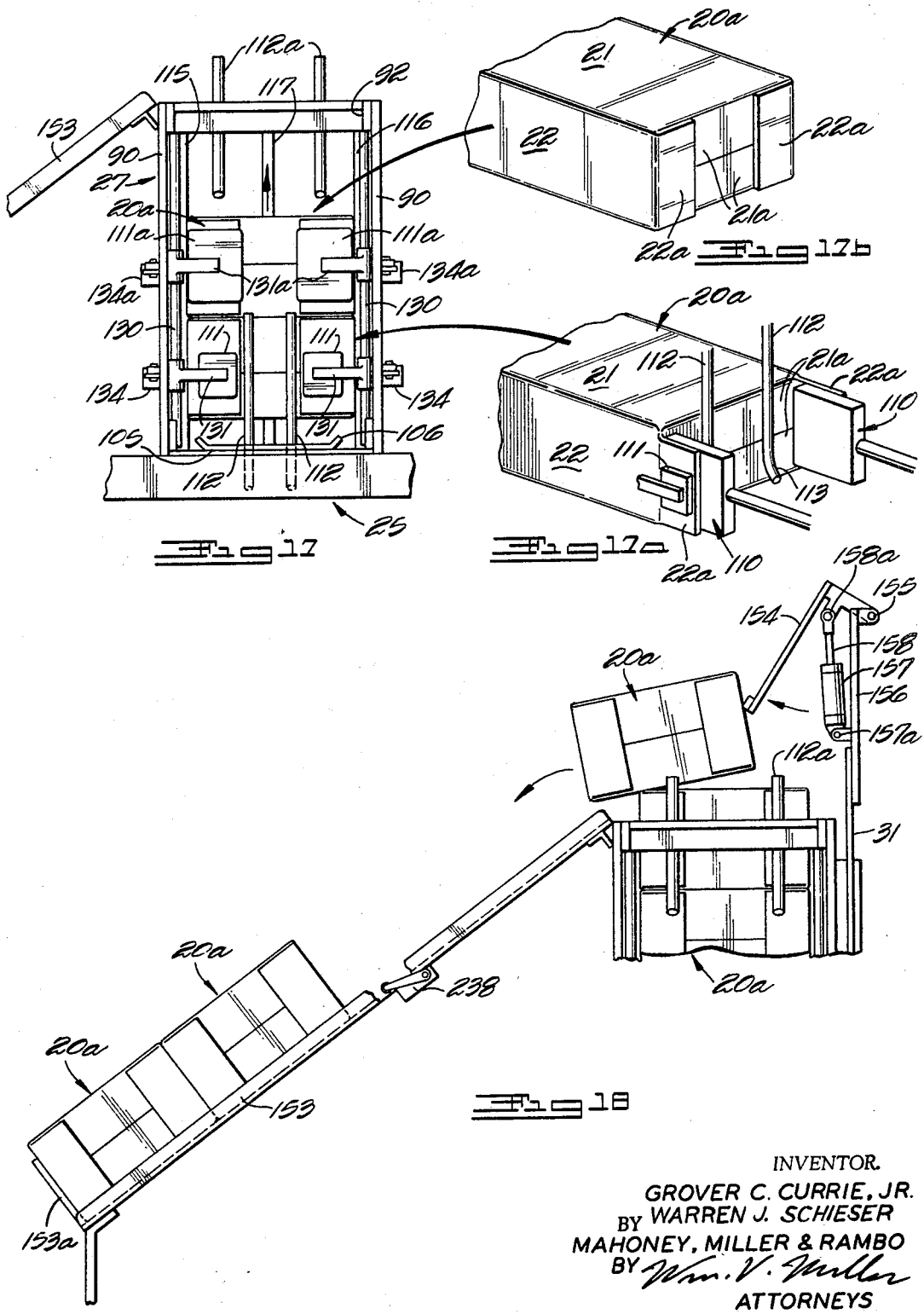

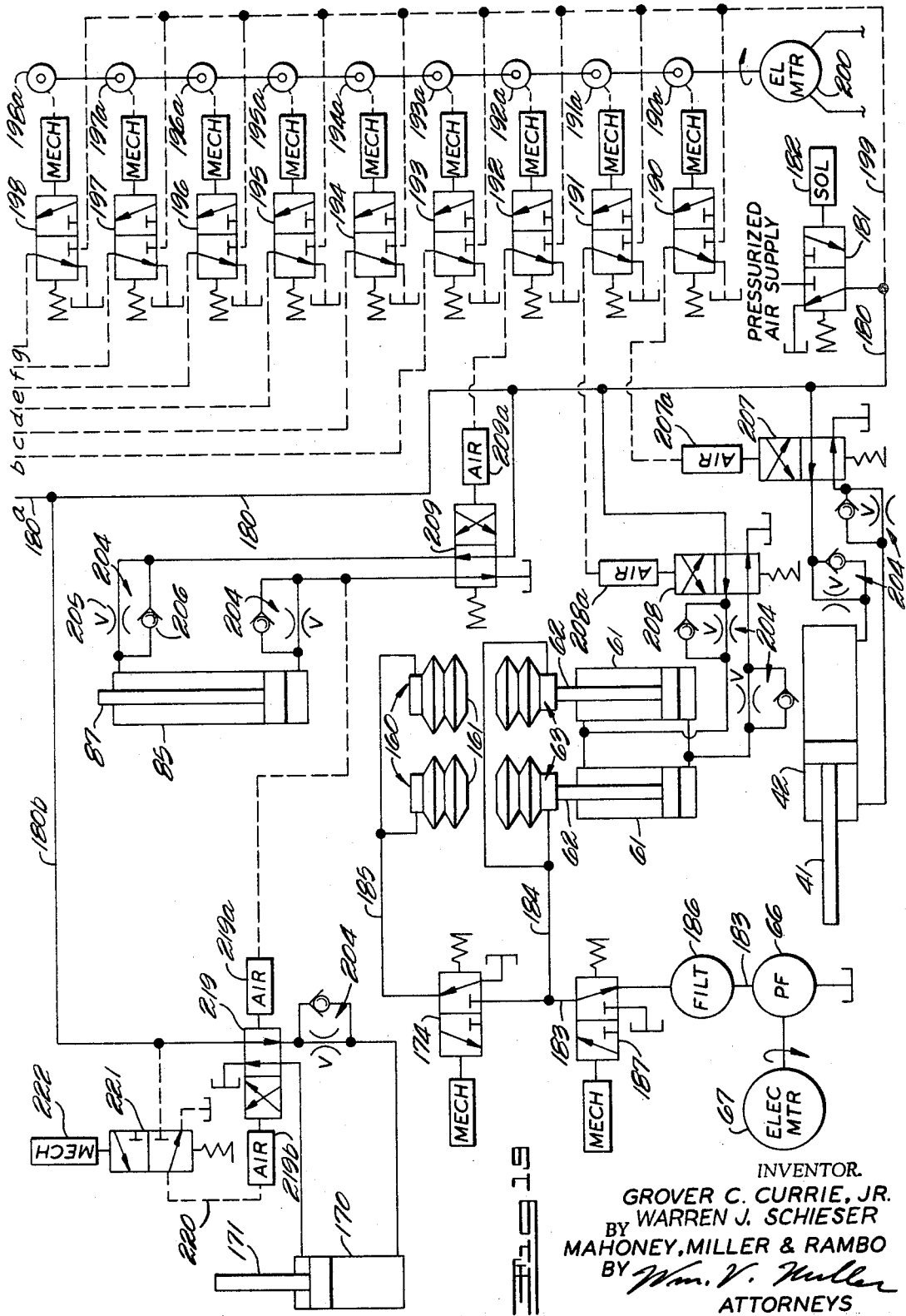

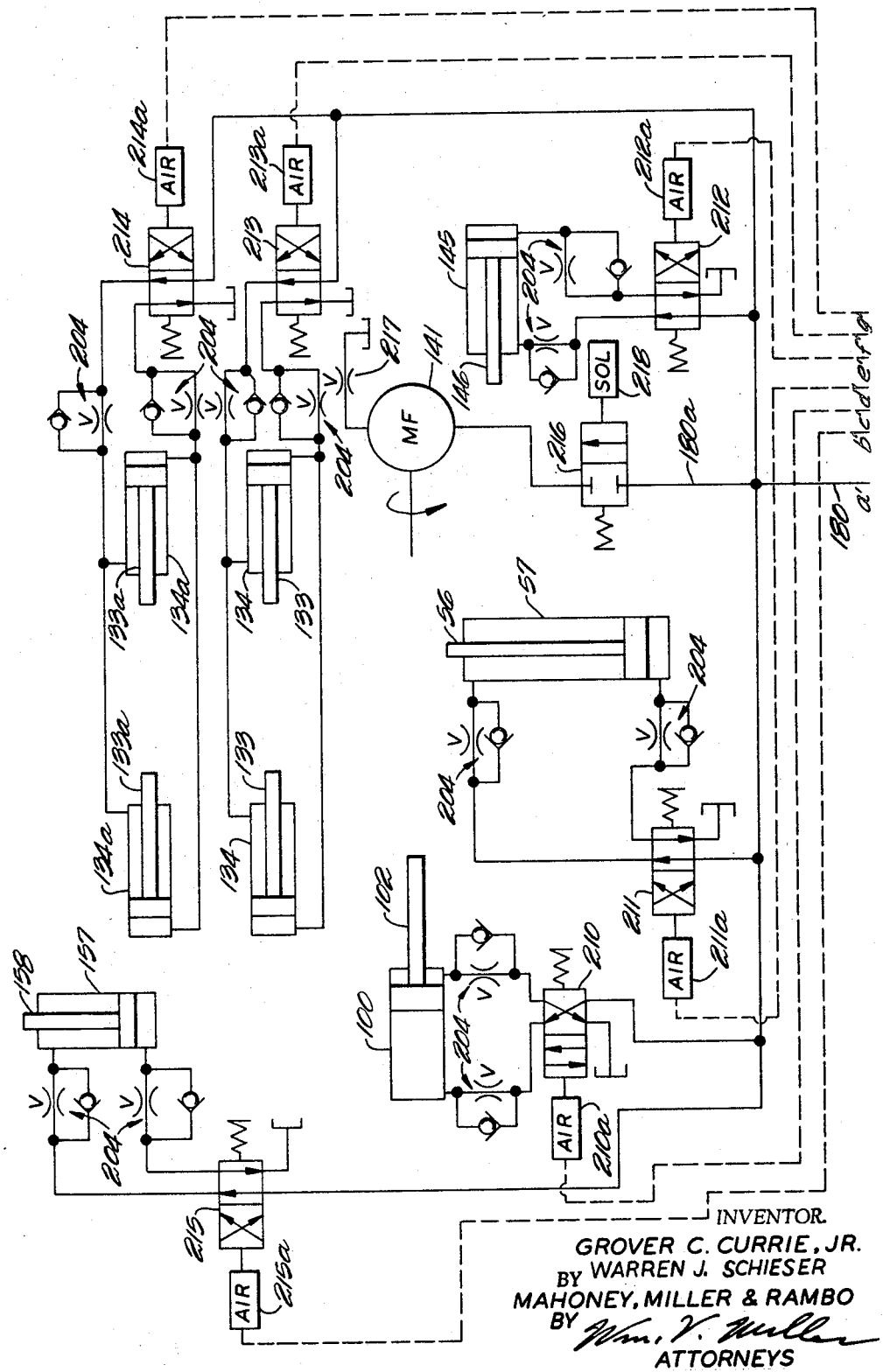

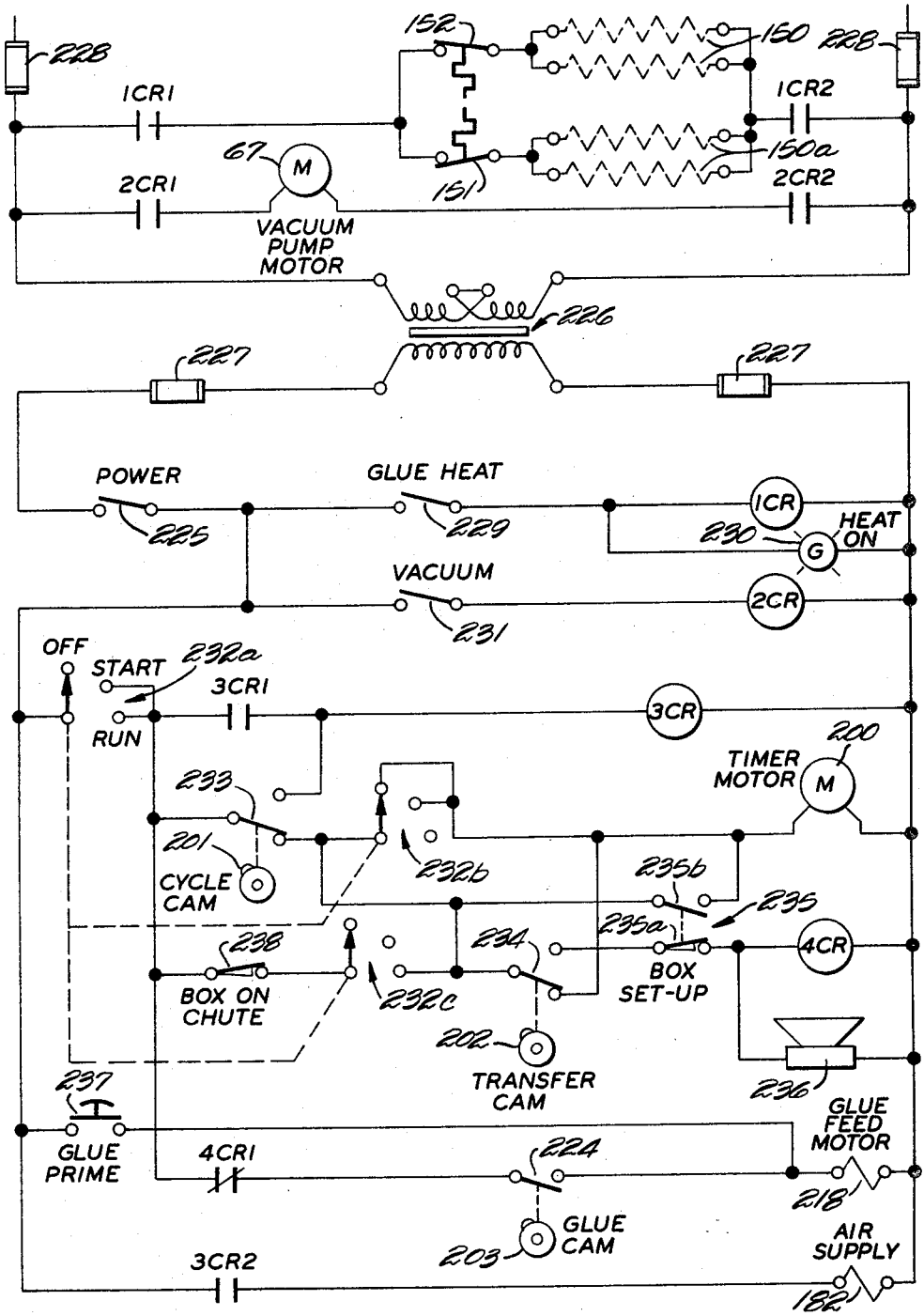

3,397,624
MACHINE FOR FORMING AND SETTING UP CARTONS FROM FOLDED AND COLLAPSED FIBERBOARD FLATS
Grover C. Currie, Jr., Charlotte, N.C., and Warren J. Schieser, Columbus, Ohio, assignors to The Corrugated Container Company, Columbus, Ohio, a corporation of Ohio
Filed Jan. 13, 1967, Ser. No. 609,209
22 Claims. (Cl. 93—36.3)

ABSTRACT OF THE DISCLOSURE

The machine disclosed herein receives folded and collapsed fiberboard flats, expands them and sets them up with the bottom flaps folded and glued in closed position and with the top flaps disposed in upwardly extending condition so that the upper end of each carton is open ready to be loaded. The machine is designed specifically for setting up paperboard cartons or boxes which are adapted to receive a plastic bag that is to be filled with milk or other liquid although it is not necessarily limited to this particular use.

---

According to this invention, the machine is provded with a hopper or magazine which receives a stack of the knocked-down cartons or boxes, each of which is in the form of a flat, collapsed tubular blank, which will be of quadrangular cross section when expanded, with top closure flaps hingedly carried by the respective side walls extending from opposite ends thereof. A feeder is mounted below the magazine for successively feeding the lowermost carton flat from the magazine to a set-up cage, provided on the machine, with the carton flat resting horizontally on one of its flat sides and the end closure flaps projecting in opposite directions. Adjacent the lower end of the set-up cage, suction means is provided for simultaneously exerting a downward pull on a lower side-wall and on an upper side-wall of the carton flat to provide oppositely directed vertical forces to partially expand the flat from its collapsed condition so as to facilitate subsequent forming or expanding operations. Forming or expander arms then engage the carton and further expand it to its quadrangular tubular form and thereafter it is moved upwardly into the cage and elevated through the cage. During this elevation, while confined by the cage, one end of the partially-formed carton is subjected to folding means which cause a pair of the bottom flaps to be folded inwardly at a right angle to the side of the carton but with the other pair of bottom flaps still extending outwardly in the planes of the respective side-walls to which they hingedly attached. Continued upward movement of the partially-formed carton in the cage brings the outwardly projecting bottom flaps up to a level where they are subjected to gluing means which applies glue to the inner surfaces thereof. During the gluing operation, movable holding and flap folding members engage the outside surfaces of the flaps to prevent outward swinging thereof and, after the gluing means moves out of contact therewith, these members are operated to swing the glued flaps inwardly over the previously inwardly folded flaps. Then the carton is moved on upwardly through and out of the cage, and during this final movement, is subjected to continued pressure by guide and pressure means which hold the superimposed flaps in contact for a sufficient time to permit setting of the glue. The set-up carton, with the bottom flaps firmly glued in closing position and the top flaps projecting upwardly, is then displaced from the top of the cage and can then be removed from the machine for loading.

The accompanying drawings illustrate one form of machine embodying this invention but it is to be understood that many details of the machine may be varied without departing from basic principles of the invention.

In these drawings:

FIGURE 1 is a view mainly in side elevation but partly in vertical longitudinal section, showing the machine, with the gluing unit removed to show other parts but its mounted position on the machine indicated in phantom.

FIGURE 2 is an enlarged, horizontal sectional view of the machine taken along line 2—2 of FIGURE 1 and showing the elevator below the set-up cage associated with the carton flat magazine and the cooperating carton expanding and forming means.

FIGURE 3 is a longitudinal, vertical sectional view taken along line 3—3 of FIGURE 2.

FIGURE 4 is a vertical, medial sectional view, taken along line 4—4 of FIGURE 3, of a carton-engaging, suction cup.

FIGURE 5 is an enlarged, fragmentary transverse vertical sectional view taken along line 5—5 of FIGURE 1 showing mainly the set-up cage and associated parts of the machine.

FIGURE 5a is a downward continuation of the view of FIGURE 5 matching at the top, at the line a'–b', with the bottom of FIGURE 5 at the line a–b showing the vacuum carton-expansion means and associated expanding or folding mechanism.

FIGURE 6 is an enlarged vertical sectional view taken at line 6—6 of FIGURE 5 showing latching means for preventing dropping of the lowermost carton from the lower end of the set-up cage.

FIGURE 7 is a top plan view of a loading slider on an enlarged scale taken along line 7—7 of FIGURE 1.

FIGURE 8 is a side elevational view of the loading slider taken along line 8—8 of FIGURE 7.

FIGURE 9 is a vertical elevational view, partly in section, of the glue feed unit taken from the position indicate by line 9—9 of FIGURE 1.

FIGURE 10 is an end elevational view of the glue feed unit taken from the position indicated by line 10—10 of FIGURE 5 or FIGURE 9.

FIGURE 11 is a fragmentary sectional view taken along line 11—11 of FIGURE 10.

FIGURE 12 is a vertical sectional view similar to FIGURE 3 showing the carton expanding and forming means in a position for receiving a folded carton flat or blank.

FIGURE 13 is a vertical section view similar to FIGURE 12 showing the carton expanding and forming means in a position sequentially advanced during a carton expanding cycle from the position of FIGURE 12 and prior to the position shown in FIGURE 3.

FIGURE 14 is a schematic view showing movement of a carton flat from the magazine into association with the expanding and forming means of the machine.

FIGURE 14a is a perspective view of a carton flat.

FIGURE 15 is a schematic view showing the carton flat formed into tubular form and resting on its side.

FIGURE 16 is a schematic view showing the lower of the bottom closure flaps of the carton being folded upwardly.

FIGURE 16a is a schematic view showing the upper of the bottom closure flaps being folded downwardly.

FIGURE 17 is a schematic view of cartons in the set-up cage showing the successive operations of folding inwardly the side flaps of the bottom closure flaps and then holding them in such position under compression to allow the previously applied glue to set.

FIGURE 17a is a perspective view of the partially formed carton with the glue being applied to the outwardly extending side flaps before the inward folding operation shown in FIGURE 17.

FIGURE 17b is a perspective view illustrating the bottom of the carton with all the closure flaps folded inwardly and secured in position.

FIGURE 18 is a schematic view illustrating the set-up cartons being displaced from the set-up cage and successive set-up cartons arranged on the machine.

FIGURES 19 and 19a contain a schematic diagram of the fluid-actuating and control system of the machine with the interconnecting fluid conduits being identified by the respective series of letters a–g and a'–g'.

FIGURE 20 is a schematic circuit diagram for the electrical control and actuating system of the machine.

With particular reference to the drawings, the general arrangement of the machine is indicated in FIGURE 1. This particular machine is designed for forming and setting up knocked-down carton or box flats 20 of the type indicated in FIGURE 14a. Each box flat, as indicated above, is a collapsed tubular blank, which will be of quadrangular cross section when expanded as shown in FIGURE 16a, having four side-walls arranged in pairs of opposed walls, the one pair being of larger area and designated by the reference character 21 and the other pair being of smaller area and designated by the reference character 22. The respective side-walls carry on their ends the oppositely extending bottom closure flaps and top closure flaps which are designated, respectively, by the characters 21a and 22a and 21b and 22b. When the box is formed and set up by the machine of the present invention, it is set up resting on one of the larger sides 21 with the bottom closure flaps 21a and 22a folded inwardly at right angles to the respective side-walls 21 and 22 to which they are hinged, in overlapping glued relationship as shown in FIGURE 17b. However, the top closure flaps 21b and 22b are allowed to remain in outwardly or upwardly projecting positions in the same planes as the respective side-walls 21 and 22 to which they are hinged. The present invention is not concerned with folding the top closure flaps inwardly but they will project outwardly or upwardly from the open mouth of the set-up box to facilitate subsequent filling or loading of the box.

The machine of this invention comprises a suitable main frame 25 which has a horizontal portion 25a at a lower level at the loading end thereof for supporting a box flat magazine 26 and a horizontal portion 25b at a higher level at the discharge end for removably supporting a set-up cage 27. For feeding the flats 20 from the magazine 26 to the set-up cage 27, a slide feeder unit 28 is provided and, for receiving the flats and elevating them in the set-up cage 27, an elevator unit 29 is provided.

The magazine 26 is adapted to receive a stack of the flats 20 with the flats disposed transversely of the machine and having the top and bottom closure flaps thereof projecting laterally. Two pairs of opposed horizontal rails 30, supported on the lower frame portion 25a, are provided at the bottom of the magazine and the rails extend longitudinally in spaced parallel relationship in the direction of feed of the flats, the opposed pairs being spaced relatively closer than the overall width of the flats so as to properly engage and slidably support the sides 21 and 22 of the lowermost flat of the stack in the magazine, together with any others superimposed thereon. The rails 30 may be suitably welded in the frame 25 at the lower level 25a at the loading end of the machine. The leading or inner side of the magazine is formed by a pair of upstanding guide strips 31 (FIGURES 1, 2 and 3) with which the leading edges of the flats 20 stacked in the magazine are adapted to engage. These strips 31 are mounted rigidly in laterally spaced relationship and are supported by the frame portion 25a. At the lower ends of the strips 21, guide rods 32 of the slide feeder unit 28 are horizontally disposed and are rigidly supported by the frame portion 25a in laterally spaced, longitudinally extending, parallel relationship, as shown in FIGURES 1 and 2. The back side of the hopper is formed by the upstanding guide bars 33 which are rigidly fixed in laterally spaced relationship being attached at their lower ends rigidly to the support rails 30 and being braced by a transverse brace 39. The sides of the hopper are indicated at 34 and 35, being at the near and far sides of FIGURE 2, respectively, and being of inverted T-form with the side 35 having its lower horizontal arm 35a (FIGURE 2) extending in the direction of feed of the flats 20 farther than the arm 34a of the side 34. The sides 34 and 35 are disposed in laterally spaced, parallel relationship for adjustment laterally toward and away from each other on the outwardly extending support rods 36 which are rigidly carried by the frame portion 25a. There are two support rods 36 arranged on each side of the magazine for support of the respective sides, 34 and 35, of the hopper. The sides carry the collars 37 which slip over the rods and are slidable thereon, being provided with setscrews 38 for holding them in selected adjusted positions to position the sides 34 and 35 in accordance with the variable widths of different type of box flats to be received and operated upon by the machine.

The slide feeder 28, shown best in FIGURES 1, 7 and 8, is adapted to engage the lowermost flat 20 of the stack in the magazine 26 and advance it while simultaneously engaging the flat next above to support the remainder of the stack in the magazine. The feeder comprises a pair of sliders 40 which are slidably mounted on the respective guide rods 32 for advancing or feeding movement or for retracting movement. The sliders 40 are reciprocated on the rods 32 by means of a cylinder and piston unit, preferably pneumatic, which includes a piston rod 41 extending from a cylinder 42 located toward one side of the frame 25 (FIGURES 1 and 2). The rod 41 has its outer end pivoted at 43, for vertical swinging movement, to a bracket 40a depending from a bracket 40b rigidly connected to both sliders 40. The double-acting cylinder 42 has its opposite or outer end similarly pivoted to the frame 25, at 44, for vertical swinging movement.

Each slider 40 at its upper side carries feed means for engaging the box flats 20 in the magazine which comprises an elongated plate 45 that extends longitudinally of the support rails 30 and which has a downturned trailing edge 46 and a leading knife-edge shoulder or abutment 47 for engaging the trailing edge of the carton flat. Also mounted on each slider 40 but beneath the plate 45 is a second plate 48 having a forwardly projecting tongue which has an upper surface 48a that angles upwardly and rearwardly to the shoulder 47. The plates 45 are of a thickness to project above the uppermost portion of the surface 48a a distance slightly greater than the total thickness of the carton flat. The plate 45 is preferably removably mounted on the slider 40 so that it can be replaced with plates of different thicknesses in accordance with the thickness of the carton flats to be supplied to the machine. As the sliders 40 are advanved on the guide rods 32, the inclined plane surfaces 48a of the plates 48 will engage the rear edge of the lowermost flat 20 in the stack and cam it up against the knife edge 47 which inclines rearwardly and downwardly as can be best seen in FIGURE 8. This flat 20 will be forced forwardly or advanced out of the magazine, as shown in FIGURE 14, it being noted that the lower ends of the forward bars 31 terminate at a point 49 (FIGURES 1 and 3) at a level above the rails 30 to provide an outlet slot at the forward side of the magazine which is at least the thickness of a carton flat. As the knife edge 47 engages and moves the lowermost flat 20, the flat upper surface of the plate 45 moves beneath the carton flat 20 next above and supports it, and the rest of the pile, sliding beneath it during the advancing stroke of the slide feeder and acting in the same manner during the retracting stroke with the downturned edge 46 moving rearwardly. It will be noted that the plate 45 is at such a level that its main flat portion is in substantially the same plane as the lowermost flat 20 resting on the rails 30.

As indicated in FIGURES 1 and 2, the opposed support rails 30 are provided at their forward ends, just ahead of the vertical bars 31, with the latch lever stops 50. Each lever is pivoted to the rail for vertical swinging movement at the pivot 51 and is weighted so that its forward end swings upwardly by gravity into the normal position indicated in FIGURE 1. However, although the forward ends of the levers 50 are normally biased upwardly above the rails 30, as the lowermost carton flat 20 is advanced along the rails, it will engage the levers and swing them downwardly until it moves past the levers when they can again swing upwardly to their normal stopping positions for preventing reverse feed of the flat. As the flat is moved out of the magazine, it moves over and onto the elevator unit 29 (FIGURE 14) which is directly below the step-up cage 27.

The elevator unit 29 is shown best in FIGURES 1, 2, 3, and 5a and comprises a horizontal platform 55 which is carried on the upper end of a piston rod 56 that extends upwardly from a double-acting cylinder 57, preferably pneumatic, which is suitably supported in upright position by the frame 25. Actuation of the cylinder 57 will raise or lower the platform 55.

Adjacent the cylinder 57, the frame carries for vertical adjustment an upstanding support arm 58 which has a horizontal portion extending toward the cylinder that adjustably supports a horizontal bracket 59 by means of a pin and slot connection 60. The bracket 59 carries a pair of vertically disposed cylinders 61 of the double-acting type, preferably pneumatic, which are provided with upwardly projecting piston rods 62 that carry axially-aligned suction or vacuum units 63 adapted to grip the lower surface of a carton flat on the platform 55. Each of the units 63 (FIGURES 3 and 4) has a bellows-type suction cup 64 at its upper end which is aligned with an opening 65, formed in the platform 55, by proper adjustment of the bracket 59 on the support 58. Actuation of the cylinders 61 will move the cups 64 into and out of the platform openings 65 and vacuum will be applied at the proper intervals to the units 63. This vacuum is supplied by a pump 66 (FIGURE 1) driven by a motor 67, both of which are supported on the lower part of frame 25. Each suction unit 63, as can be best seen in FIGURE 4, has a fluid passageway 68 formed therein and is provided with a central stop plug 69 disposed internally of the bellows 64. The stop plug 69 is formed with an upper surface 69a against which the carton surface 21 bears when suction is applied (see configuration shown in broken lines in FIGURE 4), and an open passageway 69b which is in fluid communication with the passageway 68. The passageway 69b preferably opens at the sides of the plug 69 to assure continued suction within the bellows 64 when the carton is in engagement with the end surface 69a.

A pair of laterally spaced stop and guide bars 70 (FIGURES 1, 2 and 3) are provided just ahead of and in parallel relationship to the bars 31 of the magazine and may be rigidly supported therefrom by horizontal brackets 71 which project forwardly therefrom. These bars 70 are in a common vertical plane just behind the rear edge of the platform 55 so that the edge of the platform travels vertically closely adjacent thereto. It will be noted (FIGURES 2 and 3) that the forward ends of the stop lever latches 50, when in normal stopping position, are substantially flush with the forward surfaces of these bars. It will also be noted that the bars 70 terminate at lower end 49a which are at the same level as the lower ends 49 of the magazine bars 31 so as to permit advance of the lowermost flat 20 by the sliders 40.

The carton flat 20 will be advanced until its leading or forward edge contacts with a pair of laterally spaced, vertical stop bars 75, as shown in FIGURES 3, 13 and 14, and at this time the platform 55 will be at a level corresponding to that of the upper edges of the magazine support guide rails 30. The bars 75 are carried by brackets 76 which are, in turn, carried by the longitudinally extending support rods 77 (FIGURES 2 and 3). These rods are slidably adjustable in split support collars 78 carried by the frame 25, the collars being provided with clamping screws 79 which, when tightened, will clamp the rods in longitudinally adjusted position to locate the bars 75 at proper positions forwardly or advanced relative to the stop and guide bars 70, the distance depending on the size of the carton flat 20 being formed. When the flat 20 is advanced into contact with the bars 75, the stop latch levers 50 drop behind the flat and prevent reverse feed movement on the platform 55.

At this time, the forward portion of the carton or box flat 20 will be supported by forming or expanding arms or blades 80 which will be in almost horizontal position but inclined slightly downwardly and rearwardly, as indicated in FIGURE 3. These arms, shown as three in number (FIGURE 2), extend forwardly between the stop bars 75, and associated brackets 76, and are carried at their rear ends by a transversely disposed rock shaft 81 which is located directly ahead of the forward edge of the platform 55 and is suitably rotatably mounted on the frame 25. The rocker shaft 81 is rocked at proper intervals by means of a double-acting cylinder 85, preferably pneumatic, which has its lower end pivoted for horizontal swinging to the lower portion of the frame 25 at the pivot point 86, as shown in FIGURE 1. A piston rod 87 projects upwardly from a cylinder 85 and is pivotally connected at 88 to a rocker arm 89 which is keyed to the shaft 81. Thus, actuation of the cylinder 85 will rock the shaft 81 which will swing the arms or blades 80 vertically (see FIGURES 3, 15 and 16).

Prior to the time that the cylinder 85 is actuated to swing the blades 80 upwardly, the cylinders 61 are actuated to bring the suction cups 64 into contacting engagement with the adjacent lower carton flat surface 21 and the vacuum system operated to cause the suction cups to grip the carton flat. With the suction cups 64 thus gripping the carton flat, the suction cups will tend to collapse until the carton surface 21 is brought into engagement with the stop plug surface 69a (FIGURE 4). As can be best seen in FIGURES 3 and 13, the carton flat 20 will be inclined slightly upward out of engagement with the upper surface of the elevator platform 55, except at its trailing edge, due to the inclined configuration of the blades 80. Operation of the suction cups as described will effect a downward pull on the lower sides of the carton and result in drawing of the lowermost sides 21 and 22 of the carton flat downwardly, thereby partially opening or expanding the carton. The cylinders 61 and suction units 63 are designed to position the upper surface 69a of the suction unit stop plug 69 in substantially contiguous relationship to the upper surface of the elevator platform 55 when the cylinders 61 have been actuated and the platform is in its lowermost position.

Assuming the carton flat 20 is in contact with the stop bars 75 and is over the blades 80 and the platform 55, as shown in FIGURE 13, and that the vacuum cups 64 have acted to partially open the flat, upward swinging of the blades 80, as indicated in FIGURE 3, will continue to open the flat into the rectangular tubular form, indicated at 20a in FIGURES 3, 15 and 16, which will extend transversely with the bottom and top closure flaps extending outwardly in opposite directions. At this time, the partially formed box 20a will be supported by the platform 55, which will be at its lower level, and the box will be in an upwardly opening vertical pocket formed by this platform and the upstanding fixed bars 70 together with the upstanding movable blades 80 as well as the magazine side arm 35a (FIGURE 2) which extends beyond the magazine opposite the platform 55. This extension 35a of the side will engage the outwardly projecting cover flaps 21b and 22b to stop movement of the partially formed box 20a in that direction during the folding inwardly and sealing of the opposed bottom closure flaps 21a and 22a. In the example shown, one flap 21b projects farther than the other and this will be the one engaged by the extension 35a. This upwardly opening pocket, for the partially formed box 20a, will be located directly below the cage 27.

A second pair of suction units 160 are provided to assist in opening or expanding the carton flats 20. These suction units 160, as can be seen in FIGURES 2, 3, 5a, 12, and 13, comprise a suction cup structure similar to that shown in FIGURE 4 and includes a bellows 161. Both suction units are mounted on a bracket 162 carried between two arms 163 mounted for swinging movement in a vertical plane on a horizontally disposed rocker shaft 164. The shaft 164 is rotatably mounted on the frame portion 25a in spaced parallel relationship to the rocker shaft 81 and rotation of the shaft 164 will swing the suction units 160 between a position within the space defined by the cage 27 and in contacting engagement with the upper surface of the carton flat 20 (see FIGURE 13) and a relatively elevated position out of the space defined by the cage 27 (see FIGURE 3). In the position shown in FIGURE 3, the suction units 160 will not interfere with movement of the expanded cartons 20a in the cage 27. Swinging movement of the arms 163 in timed relationship to movement of the blades or arms 80 is effected by an interconnecting mechanical linkage comprising an arm 165 fixed on the shaft 164, an arm 166 fixed on the shaft 81 with the two arms jointedly connected at 167 and 168 to an interconnecting link 169 for relative pivotal movement.

A pneumatic cylinder 170 of the double-acting type having an extensible piston rod 171 is also provided to limit the downward swinging movement of the suction units 160 at selected times and thereby prevent interference with a carton flat 20 being advanced onto the elevator platform 55. The cylinder 170 is supported on the lower frame portion 25a by a bracket 172 in a vertical position with the piston rod 171 projecting upwardly in alignment with the arm 165 and is adapted to engage a stop plate 173 attached to the arm. When the cylinder 170 is actuated thus extending the piston rod 171, the arms 165 and 163 will be maintained in the configuration shown in FIGURE 12 with the bottom of the suction bellows cups 161 maintained in upwardly spaced relationship to the elevator platform 55 to permit passage of a carton flat 20 beneath the bellows.

After a carton flat 20 has been positioned as shown in FIGURE 12, the cylinder 170 may be actuated to retract the piston rod 171 resulting in further lowering of the suction units 160 to bring the bellows cups 161 into contacting engagement with the surface of the upper sidewall 21 of the carton. Completing a fluid connection between the bellows 161 and the vacuum system pump 66 at this time will result in gripping of the carton flat by the suction units 160. Subsequent upward swinging movement of the arms 163 in conjunction with swinging movement of the forming blades 80 will result in formation of the carton 20a as previously described, with the suction units 160 assisting in opening or expanding the carton flat. The suction units 160 are only operative during a relatively small portion of their upward swinging movement, because of the relatively opposite horizontal movement of the suction units and the upper carton side 21 during the carton expansion. Also, the vacuum in the bellows 161 is released by operation of a mechanically actuated valve 174, connected in the vacuum circuit with the suction units 160, which valve is also mounted on the bracket 172. This valve 174 is actuated by an adjustable stop bolt 175 carried by the arm 165 and the operation thereof will be further described hereinafter.

The cage 27 is designed for vertical passage of the partially formed boxes 20a and is removable and replaceable as a unit in accordance with various sizes of boxes to be formed and set up by the machine. It is removably carried by the portion 25a of the frame 25 on which it rests and to which it may be removably bolted. This cage is illustrated best in FIGURES 1, 3, 5 and 17. The cage 27 is of substantially cubical but reticulate form with the upstanding corner posts 90, joined rigidly together by the lower rectangular portion 91 and the upper rectangular portion 92. The partially formed carton or box 20a is moved vertically in the cage 27 on the elevator platform 55, which will freely move vertically in the cage, and during elevation in the cage will be subjected to successive operations which first folds one of the bottom flaps 21a upwardly (FIGURE 16), then folds the other flap 21a downwardly (FIGURE 16a), applies glue to the extending side flaps 22a (FIGURE 17a), folds the flaps inwardly (FIGURE 17) and applies pressure to the inwardly folded flaps (FIGURE 17b) until the glue sets.

The lower flap 21a is folded inwardly and upwardly by means of a swingable folding arm 95 (FIGURE 2, 5a and 16) while the partially formed box 20a is supported by the platform 55 at its lowermost position, this arm being positioned on the frame 25 directly outwardly of the platform 55. This arm 95 is carried by a rocker arm 96 which is pivoted at 97 to a horizontal support bracket 98 which is carried by the frame 25, preferably for horizontal adjustment. A double-acting cylinder 100, preferably pneumatic, is carried by the support 98 at a pivot 101 and is provided with a projecting piston rod 102 which is pivoted at 103 to the rocker arm 96. As the arm 95 is swung upwardly by actuation of the cylinder 100 to retract the piston rod 102, it engages the lower flap 21a (FIGURES 5a and 16) and swings it upwardly.

After the flap 21a is folded upwardly, the elevator platform 55 is raised to lift the partially formed box 20a into the cage 27. As it is lifted, the side flaps 22a are engaged by what may be termed a plow blade 105 which is disposed in the lower end of the cage, as shown in FIGURE 1, and which will spread the flaps and insure that they are in parallel relationship in the same planes as the walls 22 to which they are hinged so that glue can be applied thereto properly after the boxes move upwardly into the cage. This blade 105 is shown best in FIGURES 1 and 5 and is in the form of a horizontally disposed plate with the upturned ends 106. It is carried by the frame 25 at a level above that of the expanded box 20a on the platform 55 in its lowermost position, approximately at the upper ends of the stop and guide bars 70. The rear upturned end 106 of the plow blade will move the rear side flap 22a into contact with the bars 70, the upturned rear end being spaced slightly forwardly of the bars 70. The other or forward, upturned end 106 will cooperate with the blades 80, which will be upstanding at this time, in a similar manner to position the other or forward side flap 22a. Thus, as the partially formed box 20a is moved vertically, the opposed flaps 22a are properly located against the members 70 and 80, respectively. Continued upward movement into the cage 27 will move these flaps 22a between the gluing heads 110 and the flap supporting and folding pads 111, associated with the cage 27, which will be described more in detail later.

At the same time that the partially-formed box 20a is lifted into the lower end of the cage and is engaged by the plow blade 105, it is simultaneously engaged by the flap folding rods or guide rods 112 shown best in FIGURES 1, 5, 17, and 17a. These rods are supported on the side of the cage and are provided with outwardly turned, lower ends 113 which extend outwardly beneath the plow blade 106 (FIGURE 5). As the partially formed box 20a is lifted (FIGURE 16a), the lower rod ends 113 engage the upper surface of the outwardly extending, upper flap 21a and fold it downwardly. Continued upper movement of the box causes the lower flap 21a to be engaged by the rods 112 and the rods then serve to hold both the flaps 21a in inwardly folded positions as the box is moved upwardly through the cage for the subsequent operations (FIGURE 17a). During this upward movement, the box is guided between vertical guide rails forming a part of the cage 27. These rails include a pair of laterally spaced, parallel rails 115 (FIGURES 1, 5 and 17) provided at the front of the cage and fixed to the lower and upper frame portions 91 and 92 thereof a distance apart less than the length of the box walls 21 and 22 extending transversely thereof. Similar guide rails 116 are provided at the back of the cage and a single guide rail 117 is provided on the far side of the cage intermediate its front and back. The opposed rails 115 and 116 at the front and back of the cage engage the opposed upright sides 21 of the partially formed box 20a whereas the single rail 117 engages the top flap 21b of the box 20a which projects to the greater extent.

All of the vertical guide rails 115, 116, and 117 are provided with stop latches at their lower ends of the type indicated in FIGURE 6 to permit upward movement of the partially-formed boxes 20a into the cage 27 but to support the lowermost box during return movement of the elevator platform 55 to its lowermost position. One of these latches 120 is shown in FIGURE 6 mounted on the rail 115 carried by a bracket 121 which is mounted for vertical adjustment by a bolt and slot connection 122. The latch 120 is in the form of a bell crank lever pivoted at a lower point 123 for in and out swinging movement relative to the vertical edge of the rail 115. A stop pin 124 on the bracket 121 limits inward or forward and upward movement of the latch and a vertically adjustable stop screw 125 limits outward or rearward and downward movement of the latch. The screw is carried by a lug 126 on the lower end of the bracket 121. As the box 20a moves upwardly into the cage 27, the angled outer edges of the latch levers 120 will be engaged thereby and the latches will swing inwardly, as indicated by broken lines in FIGURE 6, until they contact with the stop pins 124 and the boxes will pass the latches, and then they will swing outwardly by gravity until their lower corners contact the upper ends of the stop screws 125. In these positions, as indicated in full lines in FIGURE 6, the lowermost box 20a in the cage 27 will be supported by the upper blunt ends of the latches.

The flap-folding and supporting pads 111 are provided as a pair of oppositely disposed pads at the forward and rearward sides, respectively, of the cage 27 and at the near side thereof (FIGURE 1) at the same level and are initially positioned in outwardly extending, parallel relationship. These pads 111 are shown best in FIGURES 1, 5 and 17. They are carried for horizontal swinging movement by the support pivot rods 130 carried respectively at the forward and rearward sides of the cage 27 by the lower and upper portions 91 and 92 thereof. Each pad 111 is in the form of a plate disposed upright on edge and supported by a rocker arm 131 pivoted to the rod 130 at a fixed level. The rocker arm is pivoted at 132 to the outer end of a piston rod 133 which extends from a double-acting cylinder 134, which is preferably pneumatic. The cylinder 134 has its inner end pivotally supported at 135 on a vertical support bar 136 which is part of the cage 27, being rigidly connected to the horizontal portions 91 and 92 thereof. Actuation of the cylinders 134 will swing the pads 111 inwardly toward each other to fold the box side flaps 22a inwardly toward each other and over the previously inwardly folded upper and lower flaps 21a, as indicated in FIGURES 17 and 17b. However, as indicated in FIGURE 17a, before the flaps 22a are folded inwardly, glue is applied to the inner surfaces thereof and at this time the outer surfaces of these flaps will be engaged and supported by the outwardly extending pads 111 which will prevent the flaps 22a from swinging outwardly.

The glue is applied by means of the glue heads 110 previously mentioned which are shown in detail as part of the gluing unit in FIGURES 5, 9, 10 and 11. This unit is supported by the frame 25 at the lower end of the cage 27 at the near side, as indicated in phantom in FIGURE 1, and in full lines in FIGURES 5 and 9. The glue heads 110 are arranged as a pair of heads which reciprocate in horizontal parallel paths in and out of the cage 27 just rearwardly and forwardly of the respective forward and rearward pads 111, assuming the pads 111 are in their outwardly projecting positions, as indicated in FIGURE 5. The glue heads 110 and feed system for the glue, which is preferably in heated liquid condition, are of a common type. Each head has a vertically disposed, wiping or contact shoe 137 formed with a plurality of orifices 137a which, in the illustrated machine, are arranged in two sets of parallel rows with each set being adjacently disposed adjacent to the top or the bottom edge thereof, respectively. This arrangement of orifices provides a particular glue distribution which is deemed advantageous for the specifically illustrated carton configuration. Each glue head 110 is formed wtih internal passages 137b connecting with the several orifices 137a and a distributor passage 137c. Interconnecting the two glue heads 110 is a T-shaped header casting 138 having an internally formed T-shaped glue passage 138a which is in fluid communication with the respective distributor passages 137c. The base of the header casting 138 is secured to the base of a glue reservoir 139 with the passage 138a aligned with an outlet passage 139a formed in the base of the reservoir. A feed screw 140 is rotatably mounted in the outlet passage 139a and is rotated to forcibly feed glue from the reservoir 139 to the glue heads 110 and out of the orifices 137a. Driving rotation of the feed screw 140 is effected by a rotary motor device 141, which may be of the fluid-operated type, that is mechanically coupled to the feed screw through a coupling device 142. This motor is preferably of the pneumatic type and the exhaust port may be provided with a muffler device 141a.

The gluing unit, including the glue heads 110 and glue feed system, are mounted for reciprocating sliding movement on a pair of horizontally disposed guide rods 143 supported by a bracket assembly 144 carried by the frame 25. Reciprocating movement is effected by actuation of a double acting cylinder 145 to extend or retract a piston rod 146. One end of the piston rod 146 is secured to the unit by a bracket 147 and mounting plate 148 while the cylinder 145 is secured to the member 144a of the bracket assembly 144. The glue reservoir 139 and motor 141 are mounted on the plate 148 which is slidably mounted on the guide rods 143 by a pair of guide bushings 149. Thus, actuation of the cylinder 145 will reciprocate the gluing heads 110 to move over the inner surfaces of the side box flaps 22a (FIGURE 17a) and apply glue thereto before these flaps are folded inwardly by actuation of the cylinder 134 to swing the pads 111 inwardly.

Each glue head 110 and the reservoir 139 may be provided with several heating elements 150a and 150, respectively, which may be of the electrical type. One glue head is also provided with a thermally responsive switch 151 which is connected in circuit with the heating elements 150a to control the temperature of the glue in the heads and the reservoir 139 is also provided with a thermally responsive switch 152 which is electrically connected in circuit with the heating elements 150 to control the temperature of the glue in the reservoir 139.

Compressive force is applied to the flaps 21a and 22a which are in inwardly-folded, overlapping position during continued upward movement of the partially-formed box 20a in the cage 27 until the glue can set. This is accomplished by actuation of a pair of pressure pads 111a. These pads may be identical with the pads 111, pivotally mounted on the rods 130 in the same manner, and actuated in the same manner by means of the cylinders 134a. A corresponding pad is indicated with the same reference character and the suffix a. The pads 111a are located at a higher level (FIGURE 5) on the cage 27.

Continued upward movement of the box 20a in the cage 27 beyond the pressure pads 111a moves the closed bottom of the box into association with a pair of guide rods 112a similar to the rods 112 previously mentioned and which are carried at the near side of the cage toward the upper end thereof. These rods are provided with outwardly-turned, lower ends 113a (FIGURES 1 and 5) so as not to catch on the corner of the box 20a as it moves upwardly into association therewith. They continue the pressure on the overlapping glued flaps 21a and 22a of the box 20a until the box has been moved upwardly out of the cage to a position of discharge indicated in FIGURE 18 and by this time the glue is set.

As the uppermost box 20a moves upwardly out of the cage 27, it is knocked off the cage into a discharge chute 153 which extends downwardly at an angle from the top of the cage and is provided with a stop 153a at its lower end which stops movement of the boxes off the chute and causes them to accumulate thereon.

The means for knocking off the formed and set-up box from the upper end of the cage comprises a knock-off arm 154, as shown in FIGURES 1 and 18, which is of inverted L-shape and is pivoted at 155 to a vertical support 156 extending upwardly from the forward, vertically-disposed magazine guide strips 31 and preferably connected thereto for vertical adjustment. This arm 154 is swung about its pivot by means of a double-acting cylinder 157, preferably pneumatic, which is pivoted at its lower end, as at 157a, and has an upwardly extending piston rod 158 which is pivoted to the arm 154, as at 158a. Normally, the arm 154 is in the dependent position shown in FIGURE 1 but actuation of the cylinder 157 will swing the arm outwardly and engage the uppermost box 20a, as it moves upwardly out of the cage 27, to knock it off onto the inclined chute 153.

The actuating elements for the several mechanisms performing the various operations, as previously described, are of the pneumatic type utilizing either pressurized air or a partial vacuum. Automation of the carton-forming operation is effected through an electro-pneumatic control system with the pneumatic portion diagrammatically illustrated in FIGURES 19 and 19a and the electrical portion diagrammatically illustrated in FIGURE 20. This control system effects cyclic operation of the several mechanisms in properly timed relationship to continuously form the knocked-down, flat cartons into a set-up configuration with one end of the carton glued shut and ready to receive an article or articles to be placed therin.

A main pressurized air supply conduit 180 (FIGURE 19) is provided on the machine for connection with the several actuating elements and is connected to a suitable pressurized air supply source through a main shut-off valve 181. This shut-off valve 181 is of the two-position, three-way-type which, in the OFF position, as illustrated, blocks the supply inlet conduit but opens the supply conduit 180 on the machine to atmosphere to bleed off the pressure of the system and deenergize the actuating elements. This valve is spring biased to the OFF position and is actuated by an electrical solenoid 182 connected in the electrical control circuit.

The machine is also provided with a self-contained vacuum system which, as previously described, includes the vacuum pump 66 driven by an electric motor 67. The electric motor 67 is connected in the electrical control circuit for convenience of operation. An inlet conduit 183 to the vacuum pump 66 is connected to the lower suction units 63 by a branch conduit 184 and to the upper suction units 160 by a branch conduit 185. A filtering device 186 may be interposed in the inlet conduit 183 for protection of the vacuum pump from foreign objects. Primary control of the lower and upper suction units 63 and 160 is effected by a mechanically actuated, two-position, three-way valve 187 which is also interposed in the vacuum inlet conduit 183. This valve functions to release the vacuum in both branch conduits 184 and 185 and is operated by the slide feeder 28 with the valve being mounted on the frame 25 as illustrated in FIGURES 1, 14 and 15. The actuating stem of this valve is adapted to engage a bracket 188 secured to the depending bracket 40a when the slide feeder 28 is fully retracted to the right as viewed in FIGURES 1 and 15. When the slide feeder 28 is thus retracted, the vacuum release valve 187 is actuated to connect the branch conduits 184 and 185 to atmosphere. Advancement of the slide feeder 28 to the left in a carton-flat feeding operation, as shown in FIGURES 12 and 14, will disengage the bracket 188 from the valve actuating stem and the valve spool will return to the illustrated spring biased position to connect the suction units 63 and 160 to the vacuum pump 66.

With the upper suction units 160 maintained in the slightly elevated configuration of FIGURE 12, the screw 175 is adjusted to avoid actuation of the actuating stem of the vacuum release valve 174 which is interposed in the branch circuit 185. In the nonactuated position, the valve 174 opens the branch circuit 185 to atmosphere thereby eliminating any suction effect while blocking the valve port connected to the inlet conduit 183. Upon lowering of the upper suction units 160 to the configuration of FIGURE 13, the screw 175 displaces the actuating stem of the valve 174 and connects the branch circuit 185 to the vacuum inlet conduit 183 whereby a partial vacuum may be formed in the suction units 160. This vacuum is only maintained until the suction units 160 have been swung upwardly to the position shown in FIGURE 12 during displacement to the position shown in FIGURE 3.

Timed, sequential operation of the several actuating elements is effected by a cam-operated, pilot valve system with each pilot valve controlling operation of a main control valve associated with the respective actuating element. As shown in FIGURE 19, there are nine pilot valves, 190–198, of the two-position, three-way type that are spring biased and mechanically actuated, with each valve having an inlet port connected to the main supply conduit 180 by a pilot air conduit 199. Each valve, 190–198, is actuated by its respective cam, 190a–198a, having an appropriately formed cam lobe with all cams being driven by an electric timer motor 200. In addition to the pilot valve cams, 190a–198a, the timer motor 200 drives three additional cams 201, 202 and 203 (see FIGURE 20) which operate electric switches. The construction of the cam timing structure is well known and is not further illustrated or described.

Each of the several actuating cylinders is provided with fluid flow control means 204 at each end except cylinder 170 which does not have such control means associated with the piston rod end. Each fluid flow control means 204 is of similar construction comprising a selectively adjustable variable flow control valve 205 and a shunt connected check valve 206 which permits free fluid flow to the respective cylinder end. As connected, each fluid flow control means 204 is effective in controlling the fluid exhaust from the cylinder and the respective valves 205 are adjusted to obtain the desired speed of operation of the respective piston rod.

Controlling the operation of the cylinder and piston units for carton flat feed slider 28, lower suction units 63, expander blades 80, bottom flap fold arm 95, elevator 29, glue heads 110, glue fold plates 111, compression plates 111a, and carton ejector arms 154 are respective control valves 207, 208, 209, 210, 211, 212, 213, 214, and 215, shown in FIGURES 19 and 19a. Each control valve 207–215 is a two-position, four-way directional flow control valve having an inlet port connected to the main pressurized air supply conduit 180, an exhaust port which opens to the atmosphere, and two operating ports which are each connected to a respective end of the associated cylinder through the fluid flow control means 204. These valves are of the spring biased, pilot air operated type with the respective pilot solenoids 207a–215a being connected to a respective one of the pilot valves 190–198. Pressurization of each pilot solenoid, 207a–215a, by actuation of a respective one of the pilot valves, 190–198, will shift the control valve spool and effect a reversal in the direction of fluid flow through the control valve from that illustrated. Removal of pilot air pressure from a pilot solenoid permits spring return of the control valve spool to the illustrated position.

Operation of the glue feed motor 141 is controlled by an electric solenoid actuated shut-off valve 216 interposed in the pressurized air supply conduit branch 180a connected to the inlet port of the motor and a variable fluid flow control valve 217 connected to the outlet port of the motor. The electrical solenoid 218 of the valve 216 is connected in the electrical control circuit shown in FIGURE 20. Speed control of the glue feed motor 141 is effected through appropriate adjustment of the flow control valve 217.

Operation of the cylinder 170 to limit downward movement of the upper suction units 160 is controlled in conjunction with the operation of the slide feeder 28 and the expander blades 80. A pilot air operated shuttle valve 219 of the two-position, four-way direction flow control type controls the operation of the cylinder 190. The inlet port of this valve is connected by a branch conduit 180b to the main pressurized air supply conduit 180 and the outlet port exhausts to atmosphere. The two control ports are connected to respective ends of the cylinder 170 with flow control means 204 being interposed between one of the control ports and the head end of the cylinder. Displacement of the control valve spool is effected by the pilot air solenoids 219a and 219b with the solenoid 219a deriving pilot pressure from the control port of the valve 209 which is connected to the head end of the expander blade actuating cylinder 85. The other pilot air solenoid 219b derives pilot pressure from the branch conduit 180b through the pilot air conduit 220. A two-position, three-way valve 221 interposed in the conduit 220 controls fluid flow therethrough. The valve 221 is spring-biased, mechanically actuated and the operation thereof is controlled by the slide feeder 28 with the valve being supported by the frame 25a in a position where the actuating mechanism 222 will be engaged by a structural element 223 carried by the sliders 40 (see FIGURES 12 and 13). The actuating mechanism 222 is of a type which will result in actuation of the valve 221 as the sliders 40 advance to the left in a carton flat feeding operation but will not actuate the valve on retraction of the sliders to the right. This valve is positioned to be actuated shortly prior to the time that the sliders 40 are fully advanced to the left.

The operation of the pneumatic system as related to the carton forming functions of the several mechanisms is as follows, assuming the electrical control system (FIGURE 19) functioning normally with the main air supply valve 181 open, and the vacuum system motor 67 operating, and the timer motor 200 starting operation at a zero index or reference point:

(1) Cam 190a actuates pilot valve 190 to actuate control valve 207 resulting in retraction of the piston rod 41 of the slide feeder 28 (FIGURE 13) and advancing the sliders 40 to feed a carton flat 20 onto the elevator 29.

(2) Advancement of the sliders 40 will initially permit return of the primary vacuum release valve 187 to the illustrated position and the lower suction units 63 will be operatively connected in the vacuum system. As the sliders 40 approach the end of their advance stroke, the valve 221 associated with the cylinder 170 will be actuated (FIGURE 14) to momentarily pressurize the solenoid 219b placing the valve 219 in the illustrated position and cause retraction of the piston rod 171. Retraction is retarded because of the flow control means 204 (FIGURE 19) which is set to prevent complete lowering of the upper suction units 160 until the carton flat 20 has been fully advanced. Concurrently with lowering of the upper suction units 160, the secondary vacuum release valve 174 is actuated to operatively connect the upper suction units 160 into the vacuum system.

(3) Concurrently with advancement of the carton flat 20 into position, the cam 191a operates pilot valve 190 to actuate control valve 208 resulting in extension of the piston rods 62 from the parallel connected cylinders 61 to elevate the lower suction units 63.

(4) Both the lower and upper suction units 63 and 160 will now grip the respective surfaces of the carton flat 20 (FIGURE 13) to initiate the expanding operation. Cam 192a will now operate pilot valve 192 to actuate control valve 209 resulting in extension of the piston rod 87 from the cylinder 85 causing the expander blades 80 to swing upwardly (FIGURE 15). Upward swinging movement of the expander blades 80 will also result in upward swinging movement of the upper suction units 160 (FIGURE 3) through the interconnecting mechanical linkage to assist in the expanding operation. Concurrently, the pilot solenoid 219a (FIGURE 19) will be pressurized to operate control valve 219 and result in extension of the piston rod 171 from the cylinder 170. Although the control valve 209 will be operated prior to the time that the sliders 40 will have begun retraction, due to return of pilot valve 190 to the illustrated position through continued rotation of cam 190a causing retraction of the sliders 40, the valve 221 will not be actuated again at this time due to the construction of the actuating mechanism 222. Throughout this portion of the operating cycle, the lower suction units 63 will remain effective and assist in maintaining the carton on the elevator 29. The secondary vacuum release valve 174 will return to the illustrated flow position when the upper suction units 160 have swung upwardly to the position shown in FIGURE 13 and will further assist in the expanding operation.

(5) At the conclusion of the carton expanding operation with the expanded carton 20a held between the expander blades 80 and the guide rails 70 (FIGURE 15), cam 194a will operate pilot valve 194 to actuate control valve 210 resulting in retraction of the piston rod 102 into cylinder 100 causing the end flap folding arm 95 to swing upwardly (FIGURE 16). Cam 191a will now have rotated to a point releasing pilot valve 191 permitting operation of control valve 208 to cause retraction of the piston rods 62 into the cylinders 61. Also at this time, the slide feeder 28 will have returned to the starting position at the right of FIGURE 15 thereby actuating the primary vacuum release valve 187 and the lower suction units 63 will no longer grip the expanded carton 20a.

(6) Cam 195a will now operate pilot valve 195 to actuate control valve 211 resulting in extension of the piston rod 56 from the elevator cylinder 57 thereby raising the elevator platform 55 and elevating the expanded carton to the gluing station (FIGURES 3 and 17). Continued rotation of cam 195a will release pilot valve 195 permitting the control valve 211 to return to a position which will result in retraction of the elevator piston rod 56 and lowering of the elevator platform 55 to the starting position. Concurrently, cam 194a will have rotated to a position where pilot valve 194 is released permitting control valve 210 to return to a position where the folding arm 95 will be swung outwardly due to extension of the piston rod 102 from the cylinder 100. At the time that the elevator platform 55 returns to the starting position, the cam 192a will have rotated to a position to release pilot valve 192 permitting control valve 209 to return to a position to retract the piston rod 87 connected to the expander blades 80 and swing the blades downwardly. This operation also swings the upper suction units 160 downwardly but their downward movement is stopped by the piston rod 171 (FIGURE 12) which now extends from the cylinder 170.

(7) Concurrently with the carton expanding operational steps 1–6, assuming that an expanded carton is in the gluing station, the cam 196a will rotate to operate the pilot valve 196 to actuate the control valve 212 and cause the glue head piston rod 146 to extend and advance the glue heads 110 into glue dispensing relationship (FIGURE 17a), to the end flaps 22a of the expanded carton. After extension of the piston rod 146, the cam 203 (FIGURE 20) will close an electrical switch 224 completing an electrical circuit for energization of the solenoid 218 of the glue feed motor valve 216 which opens the valve resulting in operation of the glue feed motor 141 to discharge glue from the glue head orifices 137a. Cam 203 only closes switch 224 for a period of time sufficient to discharge a predetermined quantity of glue. After discharge of the glue, cam 196a releases pilot valve 196 and control valve 212 returns to a position which results in retraction of the piston rod 146 and the glue heads 110.

(8) After retraction of the glue heads 110, cam 197a operates pilot valve 197 to actuate control valve 213 to cause extension of the piston rods 133 from the cylinders 134 resulting in inward swinging movement of the folding plates or pads 111 to fold the end flaps 22a of the carton inwardly into contacting engagement with the end flaps 21a (FIGURE 17).

(9) Prior to operation of the elevator 29 to elevate a second expanded carton to the gluing position, the cam 197a will have rotated to a position releasing the pilot valve 197 and permitting valve 213 to return to a position where the piston rods 133 will be retracted.

(10) Also concurrently with an expanding operational cycle and a gluing cycle on a succeeding box, the compression pads 111a will be operated to continue application of pressure to the folded end flaps 21a and 22a of a preceding box in furtherance of the bonding action of the glue. This operation is controlled by the cam 198a which operates the pilot valve 198 to actuate the control valve 214 causing extension of the piston rods of the compression cylinders 134a. Cam 198a releases the pilot valve 198 prior to a subsequent actuation of the elevator 29 in elevating another expanded carton and the piston rods of the compression cylinders 134a retract to swing the compression pads 111a out of the way to avoid interference with upward movement of the cartons 20a through the cage 27.

(11) During each cycle of operation, the cam 193a operates the pilot valve 193 resulting in actuation of the control valve 215 causing extension of the piston rod 158 of the ejection cylinder 157 and swinging of the arm 154 to eject the uppermost carton 20a (FIGURE 18) from the top of the cage 27 and onto the discharge chute 153. Immediately, after conclusion of the carton ejection operation, the cam 193a releases the pilot valve 193 and the piston rod 158 retracts and swings ejection arm 154 downwardly.

The foregoing describes a complete operating sequence in the forming of a carton 20a from a folded or knocked-down carton flat 20, through actuation of the several mechanisms by the pneumatic control system. As previously indicated, further control over the automated operation is provided by the electrical control system shown in FIGURE 20 and further described in detail hereinafter. The electrical circuit is described as follows in conjunction with the two basic operating sequences which are "Starting of Operation" and "Placing Machine in Continuously Operating Mode."

*Starting of operation*

(1) Close the power switch 225 which connects the control circuit and power circuits to a suitable electrical power source through the control transformer 226 and circuit protecting fuse elements 227 and 228.

(2) Close the glue heat switch 229 to preheat glue in glue heads 110 and glue reservoir 139 to the desired temperature before continuing with starting procedure. Closing the glue heat switch 229 will energize relay coil 1CR to close the normally open contacts 1CR1 and 1CR2 connected in circuit with the heating elements 150 and 150a which are disposed in heat transferring relationship to the glue heads 110 and reservoir 139. These heating elements 150 and 150a are controlled by two thermostatic switches 151 and 152 which are connected in circuit with respective pairs of the heating elements 150, 150a with one thermostatic switch mounted in one of the glue heads 110 and the other mounted in the reservoir 139. When relay coil 1CR is energized, an indicated light 230 will also be illuminated.

(3) At the conclusion of the glue preheat, close the vacuum switch 231 to energize relay coil 2CR which will then close the normally open contacts 2CR1 and 2CR2 connected in circuit with the vacuum pump motor 67. The vacuum pump motor 67, when thus energized, will continue to operate providing the necessary vacuum for operation of the suction cup units 63 and 160.

The foregoing steps are accomplished with a control circuit selector switch 232 in the control circuit in the OFF position and the machine will not operate to form cartons from the carton flats 20. The selector switch 232 includes three sections a, b and c, which are simultaneously positionable in any of three positions which are identified as OFF, START, and RUN.

*Placing machine in continuously operating mode*

(1) The control circuit selector switch 232 is now placed in the START position and sections a and b of this switch will complete circuits as will be readily understood by reference to FIGURE 20. A circuit will be completed through a cycle switch 233 operated by the timer driven cam 201 from section a of the selector switch 232 to the movable contact of section b of the selector switch and to the safety circuit comprising a transfer switch 234 operated by the timer driven cam 202 and a box set-up limit switch 235 having two movable contacts 235a and 235b. The box set-up limit switch 235 is mounted on one of the guide rails 115 at the lower end of the cage 29 (FIGURES 1, 3 and 15) and is provided with an actuating arm which normally projects within the space of the cage 27. When a carton is expanded at this station, the carton will engage the actuating arm as shown in FIGURE 15 to operate the switch 235. Both the cycle cam 201 and transfer cam 202 are mechanically driven by the timer motor 200 which also drives the cams 190a–198a operating the several pilot valves of the pneumatic system that operate in timed sequence. The glue cam 203 is also driven by the motor 200 and operates the switch 224. In the START position, section b of the selector switch 232 will complete a circuit to the timer motor 200 and result in operation of this motor during such time as the cycle switch 233 remains in the illustrated position. A second circuit to energize the timer motor 200 is completed through the transfer switch 234 but this circuit is not controlling at this time.

The normally open contacts 3CR1 serially connected with the relay coil 3CR prevent energization of this relay coil at this stage of operation and the normally open contacts 3CR2 will also remain open. The contacts 3CR2 are serially connected with the solenoid 182 of the main air supply valve 181 and will prevent energization of this solenoid at this time and the several mechanisms of the machine which are operated by the air cylinder units will not operate during initiation of the operation in this step. A complete cycle is determined by the cycle cam 201 which is designed to displace the associated movable contact of the cycle switch 233 to a position opposite that illustrated in FIGURE 20, at the conclusion of a cycle and preparatory to initiation of a second or subsequent cycle.

During the time that the timer motor 200 is operating at this stage of the operation, a circuit will be completed to the normally open glue switch 224 which has a movable contact operated by the glue cam 203 through the serially connected, normally closed contacts 4CR1 which are operated by the relay coil 4CR. Although the glue switch 224 may momentarily close at some time during this initiating cycle as determined by the timing mechanism, any resultant energization of the solenoid 218 of the glue feed motor valve 216 to open this valve will not be effective to start operation of the glue feed motor since relay contacts 3CR2 are open preventing energization of the main air supply valve solenoid 182 and this latter valve 181 will remain closed. During the time that the transfer cam 202 actuates the transfer switch 234, a circuit will also be completed to a warning horn 236 which is connected in shunt relationship to the relay coil 4CR and energize both the relay and the horn since the limit switch 235 will not be actuated by an expanded carton in the cage 29. The warning horn 236 is provided to give an aural signal to the operator or attendant that there has been a malfunction requiring attention but this warning may be disregarded at this time.

Continuation of the operation of the timer motor 200 will result in actuation of the cycle switch 233 by the cycle cam 201 and thereby automatically terminate the timer motor operation at the conclusion of the cycle. Actuation of the cycle switch 233 at this point will complete a circuit to the relay coil 3CR which will be energized resulting in closing of contacts 3CR1 and 3CR2. Contacts 3CR1 form a holding circuit for the relay coil 3CR and will maintain the coil energized irrespective of subsequent operations of the control circuit elements, assuming that the control circuit selector switch 232 is maintained in either the START or RUN positions. Closing of contacts 3CR2 results in energization of the air supply valve solenoid 182 thus opening the valve 181 and the pressurized air supply will be connected to the several air cylinder units connected to the respective machine elements and thus enable operation of these elements during subsequent operation of the timer mechanism.

(2) Momentarily actuate a glue prime switch 237 which is of push button type with normally open contacts connected in circuit with the solenoid 218 of the valve 216 controlling the operation of the air-operated glue feed motor 141. Actuation of the glue prime switch 237 will energize the solenoid 218 resulting in opening of the valve 216 thereby causing the glue feed motor 141 to operate and feed glue to the glue heads 110. Such manual operation is stopped when glue appears at the outlet orifices 137a of the glue head 110 thus assuring a ready supply of glue for the first initial carton forming operation.

(3) The machine is now in condition for subsequent automatic operation in continuously setting-up and forming the cartons 20a. This automatic, repetitive cyclic operation is initiated by placing the control circuit selector switch 232 in the RUN position. In this position, section a of the switch 232 maintains a circuit to the remainder of the control circuit with the exception of the main air supply valve solenoid 182 and section b is rendered ineffective as its movable contact engages an open contact. Section c of the selector switch 232 now becomes effective as its movable contact completes a circuit to the timer motor 200 and the safety circuit. This circuit may be interrupted to prevent continued cyclic operation of the machine by the presence of a number of set-up cartons 20a on the discharge chute 153 in excess of a predetermined number which will result in actuation of a normally closed discharge chute limit switch 238 and open the circuit. The location of limit switch 238 is shown in FIGURE 18 and this switch is seen to have an actuating arm which projects upwardly into the path of the cartons 20a sliding down the discharge chute 153. However, opening of the limit switch 238 subsequent to initiation of a cycle, as when a carton 20a merely passes the switch, will not prevent completion of that cycle. After a cycle is initiated, the timer motor 200 will have revolved the cycle cam 201 to a position where the cycle switch 233 will be returned to the illustrated position and complete a circuit to the timer motor 200 and safety circuit as previously described in step 1 and the cycle operation will proceed accordingly to a conclusion with the cycle cam again opening the cycle switch. If an excessive number of cartons 20a accumulate on the discharge chute 153 and maintain the limit switch 238 open at the conclusion of a cycle when the cycle cam 201 actuates the cycle switch 233, all circuits to the timer motor 200 will be interrupted until the limit switch 238 returns to its normally closed position and operation of the machine will then continue.

Assuming that the discharge chute limit switch 238 is not actuated and remains closed, cyclic operations will continue uninterruptedly, provided no malfunctions occur, with the timer mechanism operating to actuate the several pilot valves and cam operated switches in proper sequence to enable the machine to perform the carton set-up operation.

The malfunction to which the electrical control system is designed to respond and stop further operation of the machine is the failure of a carton to form properly. The box set-up limit switch 235 is positioned to be actuated by a properly formed carton and, when thus actuated, will function to permit continued operation of the machine. However, should a carton fail to form properly, or a carton blank fail to enter the forming station for forming, the box set-up switch will not be actuated during an operating cycle and will become effective to control subsequent operations at the instant that the transfer cam 202 operates the transfer switch 234. The transfer cam 202 is designed to actuate the transfer switch 234 subsequent to the time that a carton should be formed but immediately prior to the time that the elevator mechanism 29 would be actuated to lift the set-up carton to the gluing station. When the transfer switch 234 is actuated, the previous circuit to the timer motor 200 formed by this switch is interrupted and a circuit is completed through one of the contacts 235a of the box set-up limit switch 235 to relay coil 4CR and the warning horn 236. Since the other contact 235b of the box set-up limit switch is not closed at this time, the timer motor 200 will not be energized and the timing cams will remain in the position last attained with the transfer switch 234 actuated to the second position. The relay 4CR is energized along with the horn 236 and this relay will open the contacts 4CR1 thereby interrupting the circuit of the solenoid 218 of the glue feed motor valve 216. Thus, this solenoid 218 will be deenergized irrespective of the operation of the cam operated glue switch 224 and prevent further operation of the glue feed motor 141 thereby avoiding continued discharge of glue from the glue heads 110 to compound the malfunction. The machine will remain in this configuration until steps are taken to clear the malfunction.

A malfunction may be readily cleared by either of two techniques as may be determined best for the particular malfunction. In the first, the control circuit selector switch 232 is placed in the START position and will thus avoid cutting off the main air supply thereby permitting selective operation of the machine. Immediately upon placing the selector switch 232 in the START position, the timer motor 200 will again be energized through the b section of the selector switch 232 and will continue driving the cams from the last attained position in a cycle to the zero position as determined by the cycle cam 201 which will actuate the respective cycle switch 233 to interrupt the circuit to the timer motor 200 at the conclusion of the cycle. This will permit return of the transfer switch 234 to the illustrated position and deenergization of relay coil 4CR and the warning horn 236.

Closing of the relay contacts 4CR1 may restore electrical power to the solenoid 218 of the glue feed motor valve 216, as determined by the glue switch 224, to permit completion of a gluing operation that may have been initiated during the cycle. At this time, the operator may complete clearing of the malfunction and then return the machine to automatic cyclic operation by placing the control circuit selector switch 232 in the RUN position.

In the second technique for clearing malfunctions, the control circuit selector switch 232 is placed in the OFF position. This will prevent further operation of the timer motor 200 during this cycle, deenergize the warning horn 236 and relay coil 4CR and deenergize relay coil 3CR. Deenergization of relay coil 3CR results in opening of contacts 3CR1 and 3CR2 thereby interrupting the electrical circuit to the main air supply valve solenoid 182 and this valve 181 will close to bleed the air pressure off the several air cylinder units. After clearing the malfunction the selector switch 232 is first placed in the START position with resultant operation as previously described in conjunction with placing the machine in operation and is then placed in the RUN position for further continued cyclic operation of the machine.

From the foregoing detailed description of the structure and operation of the box forming machine, it is readily apparent that a machine is provided which is capable of automatically forming set-up cartons of the type described from knocked-down carton flats. The forming operations are completed without attention by an operator and include automatic feeding of the carton flats to the machine, expanding the carton flats to the desired configuration, fold and glue the end flaps at one end, and discharge the completed carton from the machine. The machine is provided with an electro-pneumatic control system which maintains the repetitive cyclic operation of the machine but includes a malfunction sensor which is responsive to malformation of a carton and operative to stop further operation of the machine.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A machine for setting up carton flats which are of flat tubular form with a main axis and closure flaps projecting from one end thereof in the direction of the axis, comprising a magazine for supporting the flats in superimposed flat relationship with the axis transversely disposed and with the closure flaps projecting laterally at one side thereof, feed means for feeding the flats successively to an expanding station, a set-up cage opposite the expanding station, means for engaging each flat at the expanding station to expand it into hollow tubular form and to move the expanded flat into the cage with the projecting closure flaps at one side of the cage, and means along the cage for folding the closure flaps inwardly into closing position relative to the expanded hollow tubular form and for retaining them in said position as the expanded tubular form is moved therethrough.

2. A machine according to claim 1 in which each of the flats acted upon includes a plurality of sides hinged together along hinge lines which are transversely disposed relative to the direction of feed by said feed means with opposed sides folded together in superimposed relationship so that there is a hinged joint at the leading and trailing ends of the flat, said closure flaps projecting from and being hinged to the respective sides of the flat substantially at right angles to said hinged joints, said expanding means for the flat including means for engaging the flat at its leading and trailing hinged joints respectively and moving the joints toward each other.

3. A machine according to claim 2 in which said expanding means also includes means for simultaneously engaging the opposed superimposed sides and spreading them apart.

4. A machine according to claim 3 in which said last-named means comprises vacuum cups for engaging and gripping the respective sides, and means for moving said vacuum cups away from each other while simultaneously moving said hinged joint engaging means toward each other.

5. A machine according to claim 3 in which said folding means along the cage comprises means for successively engaging the closure flaps and folding them inwardly at right angles to the sides which carry them so that they are in superimposed closing relationship and means mounted in cooperative relationship with and along the cage for applying glue to certain closure flaps before they are folded inwardly.

6. A machine according to claim 5 including means located along the cage for applying pressure to the superimposed glued flaps to permit setting of the glue before the set-up carton leaves the cage.

7. A machine according to claim 1 in which the magazine is disposed in vertical upstanding position for receiving a vertical stack of the superimposed flats, each of which includes a plurality of sides hinged together along hinge lines which are transversely disposed with opposed sides folded together in superimposed relationship so that there is a hinged joint at the leading and trailing ends of the flat, said feed means comprising a slider type feed mounted for reciprocating horizontal movement beneath the magazine for engaging the lowermost flat at its trailing hinged joint and advancing it horizontally to the expanding station, an elevator at the expanding station initially at a level for receiving and supporting the flat, said set-up cage being located above said elevator in vertical alignment therewith, said means for engaging the flat at the expanding station including expanding arms disposed beyond said elevator and swingable upwardly and rearwardly into engagement with the leading hinged joint of the flat moved onto said elevator, means for swinging the expanding arms upwardly, and means for moving the elevator upwardly to lift the partially formed carton into the set-up cage.

8. A machine according to claim 7 in which the flats acted upon have the closure flaps hinged to the respective sides along hinged joints disposed at right angles to the hinged joints between the sides, said expanding means at the expanding station including means for engaging the flat at its opposed flat sides which are uppermost and lowermost, and means for moving said last-named engaging means vertically apart as said expanding arms are swung upwardly.

9. A machine according to claim 8 in which said last-named engaging means comprises upper and lower suction cups for respectively engaging and gripping the uppermost and lowermost sides of the carton flat, the lower suction cups being disposed below the elevator and being mounted in association therewith for pulling the flat downwardly and holding it on the elevator, the upper suction cups being swingable from a position over the elevator in engagement with the flat thereon upwardly and outwardly to a position beyond the elevator so as not to interfere with the vertical movement thereof.

10. A machine according to claim 9 including a vacuum system connected to said suction cups, said vacuum system including a vacuum control valve actuated by said slider type feed means.

11. A machine according to claim 8 in which the flat acted upon by the closure flaps includes four sides hinged together along hinge lines with a closure flap hinged to each of the sides so that when the carton is expanded there are two projecting side flaps, an upper flap and a lower flap, said means along the cage for folding the closure flaps inwardly into closing position includes means for first folding the lower flap inwardly and upwardly, means for then folding the upper flap inwardly and downwardly, and means for then folding the two side flaps inwardly.

12. A machine according to claim 11 including means mounted along the cage for applying glue to the side flaps before they are folded inwardly.

13. A machine according to claim 11 in which said means for folding the flap inwardly and upwardly comprises an arm pivotally mounted adjacent the lower end of the cage and connected to fluid-actuated means for swinging it upwardly and inwardly toward the cage, said means for folding the upper flap downwardly and inwardly comprising pressure applying bars extending vertically along the cage and adapted to engage the upper flap after the expanded carton is raised upwardly in the cage by the elevator, said means for folding the two side flaps inwardly comprising lower pads pivotally supported at a selected level along the cage for swinging about vertical axes toward each other after the projecting side flaps are moved to a corresponding level in the cage and connected to fluid-actuated means for controlling said swinging action, additional similar upper pads mounted above the level of the first pads along the cage for swinging over the inwardly folded side flaps to apply additional pressure thereto, and pressure rods mounted on the cage above the last-named pads for engaging the inwardly folded closure flaps to continue application of pressure thereto as the carton is moved upwardly through the cage.

14. A machine according to claim 13 including glue heads mounted adjacent the cage for moving in and out relative to the cage to move over the side closure flaps when they project outwardly from the carton, said means being mounted at substantially the same level as said first-named pads and being adapted to engage the inner surfaces of the flaps which will be backed-up by said pads, and means for controlling said glue heads to move them horizontally inwardly over the flaps and then retract them horizontally away from the flaps and feeding glue to the heads while they are in their inward positions in association with said closure flaps.

15. A machine according to claim 14 including a blade arrangement disposed adjacent the lower end of the cage for engaging the projecting side closure flaps and swinging them outwardly against said lower flap folding pads as the carton is elevated into the cage by said elevator.

16. A machine according to claim 7 including one-way latch means mounted at the lower end of the cage for permitting movement of the expanded cartons upwardly into the cage but preventing dropping of the cartons from the cage.

17. A machine according to claim 13 including means adjacent the upper end of the cage for engaging the uppermost carton to displace it from a position above the cage onto a receiving support.

18. A machine according to claim 17 in which said receiving support comprises an inclined chute for receiving a plurality of the cartons, stop means along the chute to engage a leading carton and cause succeeding cartons to accumulate on the chute until removed, and a control member along the chute engaged by a carton when a predetermined accumulation occurs on the chute, said means for moving the elevator including fluid-actuated means, a control system for all of said fluid-actuated means with said control system operative to maintain cyclic operation of said machine in continuously forming cartons, said control member being connected in and controlling said system to interrupt the continuous operation of the machine when a predetermined number of cartons accumulate on the chute.

19. A machine according to claim 18 including an additional control member connected in said control system and mounted in cooperation with said expanding station so that it is responsive to a properly expanded carton at said expanding station and controlling said system to interrupt the continuous operation of the machine when a carton is not properly formed at said expanding station.

20. A machine according to claim 14 including glue heads mounted adjacent the cage for moving in and out relative to the cage to move over the side closure flaps when they project outwardly from the carton, said heads being mounted at substantially the same level as said first-named pads and being adapted to engage the inner surfaces of the closure flaps which will be backed up by said pads, and fluid-actuated means for moving said glue heads and controlling feed of glue thereto, said means being also connected in said control system.

21. A machine according to claim 7 including latching means adjacent the rear edge of said elevator for engaging the trailing edge of the flat fed onto said elevator by said slide feeder to prevent rearward displacement of said flat upon retraction of said slide feeder.

22. A machine according to claim 10 including an additional vacuum control valve connected in said vacuum control system and engaged upon swinging of said upper suction cups over the elevator.

References Cited

UNITED STATES PATENTS

| | | | |
|---|---|---|---|
| 1,834,743 | 12/1931 | Schmiedel | 93—49 |
| 3,027,815 | 4/1962 | Anness | 93—53 |
| 3,097,463 | 7/1963 | Neal | 93—53 |
| 3,313,219 | 4/1967 | Michel | 93—36.3 |

WAYNE A. MORSE, JR., *Primary Examiner.*